(12) United States Patent
Christensen et al.

(10) Patent No.: US 8,255,526 B2
(45) Date of Patent: Aug. 28, 2012

(54) METHOD FOR COLLECTING HUMAN EXPERIENCE ANALYTICS DATA

(75) Inventors: Jakob Hjort Christensen, Kastrup (DK); Michael Seifert, Charlottenlund (DK)

(73) Assignee: Sitecore A/S, Copenhagen V (DK)

( * ) Notice: Subject to any disclaimer, the term of this patent is extended or adjusted under 35 U.S.C. 154(b) by 328 days.

(21) Appl. No.: 12/622,934

(22) Filed: Nov. 20, 2009

(65) Prior Publication Data
US 2010/0146110 A1 Jun. 10, 2010

Related U.S. Application Data

(60) Provisional application No. 61/121,426, filed on Dec. 10, 2008.

(51) Int. Cl.
*G06F 15/16* (2006.01)
*G06F 15/173* (2006.01)

(52) U.S. Cl. ........... 709/224; 709/203; 709/223

(58) Field of Classification Search ......... 709/223, 709/224, 227, 228, 229; 705/8, 14; 707/3
See application file for complete search history.

(56) References Cited

U.S. PATENT DOCUMENTS

| 6,661,431 | B1 | 12/2003 | Stuart et al. | |
|---|---|---|---|---|
| 2003/0167195 | A1* | 9/2003 | Fernandes et al. | 705/8 |
| 2004/0064443 | A1* | 4/2004 | Taniguchi et al. | 707/3 |
| 2007/0250468 | A1 | 10/2007 | Pieper | |
| 2008/0243612 | A1* | 10/2008 | Blinnikka | 705/14 |
| 2009/0172021 | A1* | 7/2009 | Kane et al. | 707/104.1 |
| 2010/0017695 | A1* | 1/2010 | Palmieri | 715/205 |

FOREIGN PATENT DOCUMENTS

WO WO 2007/134306 A2 11/2007
WO WO 2008/094712 A2 8/2008

OTHER PUBLICATIONS

Havenstein, "Life after page views: Web analytics 2.0", Feb. 25, 2008, p. 1, http://www.computerworld.com/s/article/9064558/Life_after_page_views_Web_analytics_2.0?taxonomyId=161&pageNumber=1&taxonomyName=Analytics.
Kamplye Feedback Analytics, Jul. 31, 2008, pp. 1-2, http://www.kampyle.com/addon/download/Kampyle_Newsletter_July30_2008.pdf.
"NuConomy Reinvents Web Analytics with New Proactive Approach", pp. 1-2,http://www.nuconomy.com/, (2008).

* cited by examiner

*Primary Examiner* — Quang N. Nguyen
(74) *Attorney, Agent, or Firm* — Birch, Stewart, Kolasch & Birch, LLP

(57) ABSTRACT

A method for collecting human experience analytics data for visitors browsing a Web site and a web analytics data collection engine are disclosed. The method comprises the steps of registering an action performed by a visitor browsing the Web site, categorizing said registered action as a navigation action between web pages of the Web site and/or as an event action within a web page of the Web site. In the case that the registered action is categorized as an event action, the event is associated with a web page of the Web site, and the action is recorded as an event within the associated web page. In the case that the registered action is categorized as a navigation action, the action is either recorded as a navigation from a current web page to a subsequent web page, or recording of the action is cancelled, based on previously defined criteria. Finally, the recorded events and navigations are stored in a data storage facility.
The invention allows the owner of the Web site to collect and store data which reflects the human experience of visitors browsing the Web site. This may be used for adjusting design of the Web site and/or for customizing information presented to the visitor.

12 Claims, 14 Drawing Sheets

METHOD FOR COLLECTING HUMAN EXPERIENCE ANALYTICS DATA

This Nonprovisional application claims priority under 35 U.S.C. §119(e) on U.S. Provisional Application No. 61/121,426 filed on Dec. 10, 2008, the entire contents of which are hereby incorporated by reference.

FIELD OF THE INVENTION

The present invention relates to a method for collecting human experience analytics data and to a web analytics data collection engine for collecting human experience analytics data. The method of the present invention is adapted to collect analytics data relating to actions performed by a visitor browsing a Web site.

BACKGROUND OF THE INVENTION

Web clients, such as Web browsers, request resources from Web servers. Owners of Web servers use Web analytics tracking software to generate reports of this user activity on the site. Web analytics packages generally track aggregate data, such as the number of requests for a given Web page (see Web Page, below), and user-specific data, such as the sequence of Web pages requested by Web clients during a visit.

Terminology

This section defines terminology used throughout this document.

Web Protocol and HTTP

A Web protocol is a communications technology used to communicate between devices connected to the Internet. Web protocols include HTTP, HTTPS, Web services, AJAX, Web-DAV, and others including those not yet developed. Because most Web communications occur over the HTTP protocol, this document uses the term HTTP as a synonym for Web protocol, but the invention that is the subject of this document could be used with any Web protocol.

Web Client

A Web client is a device that can access content on the Internet using one or more Web protocols. A Web client could be a Web browser, an email client, an RSS reader, or a mobile or other digital device.

Web Server

A Web server is a device that responds to requests placed over the Internet using Web protocols. A server can include multiple virtual or physical machines providing "responses to web protocol requests" such as the pages of a Web site, RSS data, or any other data. Often such web servers are behind a device that balances the workload between the servers.

Web Site

A Web site is a collection of Web pages, Web application components, and other resources residing on a Web server that collectively implement a complete Web solution. Each Web site typically corresponds to a single domain or subdomain.

Web Analytics

Web analytics refers to a software system that tracks and reports requests from Web clients to one or more Web servers. Web analytics include aggregate information, such as the total number of visitors or number of visits to a specific page, as well as sequential information, such as the sequence of Web Protocol requests sent by each user (such requests typically being interpreted as web pages).

Session

A session is a sequence of interactions between a Web client and a Web server, such as a series of Web pages (protocol requests) on a Web server accessed by a Web client by a single Web user between the user opening and closing the Web client.

URL, Protocol, Domain, Path, and Query String Parameters

A URL identifies a resource on a Web server. A URL can include a Web protocol specification, a domain, a top-level domain, a subdomain, a port, a path, an extension, any number of query string parameters, an anchor, and various characters used to separate these tokens. For example, in the URL http://www.domain.tld:port/path/to/resource.html?key1=value1&key2=value2#anchor:

http represents a Web protocol specification.
    www represents a subdomain within a domain.
    domain represents a domain.
    tld represents a top-level domain.
    port represents a port to be used by the TCP/IP protocol.
    /path/to/resource represents a path.
    html represents an extension.
    The question mark character ("?") separates the path from the query string parameters.
    key1 represents the name of a query string parameter.
    value1 represents the value of the query string parameter named key1.
    key2 represents the name of a query string parameter.
    value2 represents the value of the query string parameter named key2.
    anchor represents an anchor identifier.
    All other characters separate these various tokens.
    URLs can have even more properties than described above and are well described in various Internet RFCs.

HTTP Request/Response, Primary Request, and External Request

Web clients interact with Web servers by placing requests over the Internet using HTTP or other Web protocols. An HTTP request includes a URL, as well as additional information such as state information (e.g. cookies) and details about the Web client placing the request. The Web server responds using the HTTP protocol, typically with a message containing HTML or XML markup. Elements in the response to the primary request can contain references to other resources that result in the Web client placing additional HTTP requests to retrieve resources, such as images, style sheets, JavaScript source code, multimedia and other components, either from the same Web server, or from additional Web servers. The original URL requested by the Web client is the primary HTTP request. As the Web client processes the response from the Web server, the Web client initiates additional HTTP requests for these components to construct the Web page.

After a Web client loads all of the resources that make up a Web page, logic within the Web page can cause the Web client to place additional HTTP requests, such as using AJAX (see Javascript and AJAX). The term request simply indicates the device initiating the communication, and does not always indicate that the Web client has requested a resource from the Web server; the request sometimes conveys more information than the response. The Web client may process certain responses from the Web client using logic rather than outputting them in the Web page rendered in the Web client.

A Web client can initiate a Web request for a number of reasons. A user may launch the Web client, causing it to request the user's home page and all the resources it references. The user could enter data into a search Web component and click a button, causing the Web client to place another request to the same Web server or another Web server. The user could click a link in the search results, causing the Web client to request another Web page, or triggering custom logic such as JavaScript that could initiate one or more HTTP requests.

Each HTTP request corresponds to a URL, but can include additional information such as the type, version, and features of the Web client, the Web client's language preferences, the state of Web components in the current Web page, cookies identifying the user or controlling other features (see Cookies, below), and other information.

A Web page may contain markup or other content that causes the Web client to place one or more External Requests to achieve Web analytics functionality. For example, a Web page may contain JavaScript that causes the Web client to place an HTTP request not for a Web page, image, or other content resource to display within the primary Web page, but to transmit information about the primary request to a Web analytics server.

Web Page (Page)

The term Web page, or page, describes the result of a complete HTTP request and response, including any additional HTTP requests and responses required to load images, CSS files, and other resources. The term Web pages includes both the data and communications required to represent and transmit the Web page, and the user's experience of that collection of resources as a single logical component in a Web client. Web clients other than Web browsers, such as RSS readers and mobile devices, can access Web pages.

Web Component

A Web component is a feature within a Web page, such as an image, a search box, a login form, a shopping cart, a multimedia resource, or another type of component. A Web page typically consists of a hierarchy of numerous Web components, such as an HTML table containing a login form containing a username text input component, which may exist within a Web page that also contains a search box, a survey, any number of links, and any number of additional Web components.

Component Impression

A component impression is a single distribution of a Web resource, such as the inclusion of an advertisement which makes up only a part of a Web page. A Web page can include multiple component impressions.

Form Post and Postback

Certain events within Web components in a Web page can cause the Web client to place additional HTTP requests posting the state of the current Web page to a Web server. The term form post indicates a Web client posting the state of a Web form to the Web server, but this is not the only use of form posts. A Web page can post to itself or another Web page. A postback occurs when a Web page posts to itself instead of posting to a different Web page.

For example, a Web page may contain a survey Web component comprising a question, a series of answers, and a button to submit the response to the survey. The survey Web component could indicate that when the user submits his/her response, the Web client should post the survey data to a different Web page (a form post) that returns survey results to render in the Web client, or the same Web page (a postback) that causes the Web client to render the same information. A Web analytics engine could track every HTTP request, recording two requests for the same news page in the case of a postback. The survey Web component could use AJAX to cause additional HTTP requests during the form post or postback.

Page Impression

A page impression is a single visit to a Web page. A page impression can contain multiple component impressions.

When a user takes an action within a page that results in a postback, the page returned to the Web client may contain new component impressions, or the same component impressions, possibly containing data updated because of the postback.

Navigation

Navigation is what happens when the user requests a web page through the web client. For example, when a user opens a Web client, the Web client typically places an HTTP request for a Web page; the user has navigated to that Web page. When the user clicks on a link in that Web page, the Web client places another HTTP request for another Web page. Various other user actions can result in the Web client navigating to a Web page.

Users can navigate between Web pages in predictable and unpredictable ways. A user could access the home page of a Web site, and select a link from that page to another page within the Web site. A user could use a bookmark or enter a URL into their Web client to access a Web page directly. A user could select a link to a Web page in search results on the Web site or an Internet search engine.

While in most cases navigation refers to requesting different Web pages in sequence, in some cases a user may navigate to the same Web page twice in sequence. For example, a Web page may contain a link to itself, or another feature that when accessed, causes the Web client to place another primary HTTP request for the same Web page. A user would not typically navigate twice in sequence to the same Web page, but a user might navigate to the same page twice unintentionally, such as by clicking a link that they do not realize references the same Web page that they are already viewing. A Web analytics engine may report a postback as a user navigating twice to a single Web page.

JavaScript and AJAX

Web components can contain Web page programming code in Web scripting languages, most commonly JavaScript. Various system and user events, such as the Web client completing loading of a Web page or a user clicking on a Web component, can trigger JavaScript that controls the behavior of the Web client, including Asynchronous JavaScript and XML (AJAX). AJAX refers to using logic in the page to place HTTP requests and process responses instead of having the Web client load the response directly. A Web server or Web analytics server responds to HTTP requests from AJAX components with XML, code, or data in other formats. The Web component placing the AJAX HTTP request can process the data or execute the code returned from the Web server, such as to update the user interface shown on the Web page. Some Web clients do not support JavaScript, and it is possible for the user to disable JavaScript in others.

Action

An action represents a user activity within a Web component in a Web page. A user action raises an event.

Event

An event represents something that happened within a Web component in a Web page, such as the user action of clicking a button component, or a multimedia component reaching the end of a video. Events within a Web component can cause the Web client to place additional HTTP requests that do not cause the Web client to load a new Web page, but instead update a Web component in the current Web page, or in the case of Web analytics, record a user action. A single page impression can involve numerous actions and events, such as the action of a user clicking the play button in a multimedia component, and the event of that video reaching its conclusion.

Cookie

When a Web client requests a resource from a Web server, the response can include a cookie. The Web client includes that cookie in subsequent requests to the same Web server. Each cookie is associated with a domain (possibly including a subdomain), and the Web client only transmits the cookie when requesting a URL in the same domain that provided the cookie. A cookie can include various types of information, including a token that uniquely identifies the user of the Web client. Some Web clients do not support cookies, and it is possible for the user to prevent other Web clients from accepting cookies. But in reality most websites do not work when the user disables cookies. Web clients support session cookies, which disappear when the user closes the Web client, and permanent cookies, which persist across multiple sessions.

(If cookies are disabled there are other means of achieving the same functionality, such as injecting a cookie code into e.g. the domain name or in another part of the URL of all requests for that session).

Redirect

A Web server can respond to an HTTP request with a redirect, which forwards the Web client to another URL.

Referrer

A referrer is the URL of a Web page that contains a Web component such as a link that, when accessed, causes the Web client to place another primary HTTP request. Not all HTTP requests include a referrer, such as when the user opens their home page or activates a bookmark in the Web client.

Web Server Log

Most Web servers log each HTTP request to a log file or other data storage mechanism, and provide options to include various information about the request including the date and time, the requested URL, the Web client, the referrer, cookies, the response status such as success or error, and other details.

Web Analytics Server

A Web analytics server is a server that provides Web analytics functionality for collecting data for requests and performing analysis/reporting on that data. Some Web analytics servers obtain information by parsing Web server logs. Other Web analytics servers are themselves Web servers, but instead of serving content, use external requests embedded in primary Web pages to track those primary Web page requests. Other systems use a combination. Developers using such Web analytics solutions embed resources such as markup or script in primary Web pages to cause the Web client to place an additional external request. This external request often uses the URL of an image on the Web analytics server, including query string parameters containing data relevant to the Web analytics server, such as the URL of the primary request, and using cookies provided by the Web client. The Web analytics server uses this information to track the primary request, and may respond to that request with a cookie to support additional Web analytics tracking functionality, but that response includes no content to display as a Web component within the primary Web page. Other Web analytics servers may use AJAX or other technologies instead of using image URLs.

Most Web servers primarily serve content; Web analytics servers primarily track information about Web clients. Web analytics engines use HTTP requests not to request resources from Web servers, but to report information from a Web client. Most Web analytics servers track the sequence of pages visited by each user, but do not report every HTTP request, such as requests for images, style sheets and JavaScript include files. Web analytics servers can report AJAX requests if the site owner has programmed the Web site to send information from the AJAX function to the Web analytics server.

Web analytics servers commonly include a cookie in their responses to requests from Web clients in order to track individual users. Such analytics engines use permanent cookies, allowing the Web analytics system to track individual users through multiple sessions. A Web analytics server can track a user's actions on multiple Web sites that use a common Web analytics server. For example, if a user accesses both cnn.com and nytimes.com, then each of these sites cannot know that this user is accessing the other. If both sites use a Web analytics facility such as Google Analytics, then through the means of a cookie, Google Analytics will know what content this user has accessed on both sites. By using a persistent cookie, the analytics engine can track the user's actions across multiple sites in multiple browsing sessions.

Thereby Google Analytics becomes a global surveillance facility for tracking user navigation across Web sites and Web client sessions. From a privacy standpoint this is clearly undesirable to the person visiting the websites, not knowing that this is going on. And it defeats the purpose of the security built into the cookies, namely that a cookie was only intended to be readable for the domain by which it was issued.

One may expect that in the not too far away future, web browsers will safeguard the privacy of individuals by blocking out requests for e.g. Google Analytics and similar global surveillance services.

Application Programming Interface (API)

An Application Programming Interface, or API, defines conventions for a computer programming language by which developers accesses the features of a software system.

Web Content Management (WCM)

A Web Content Management system (WCM) provides software residing on one or more Web servers that facilitates WCM users updating the content of one or more Web sites. WCM systems comprise two logical components: a content delivery component, which responds to requests for content on Web sites, and a content management component, which provides facilities for developers and WCM users to build and manage the Web components and the content of the Web sites.

Content Management System (CMS)

A Content Management System (CMS) provides software that allows CMS users to maintain content, or data within an information system. While the term CMS can include Enterprise Content Management (ECM) and other implementations, for the purposes of this document, CMS and WCM are synonymous.

User Profile Properties

Many Web sites manage information about users, such as location, gender, age, areas of interest, and other. Collectively, these attributes are known as user profile properties.

Web Analytics Strategies

Existing Web analytics engines use the following primary strategies to record user actions on Web sites: parsing Web server logs, embedding code or resource requests in Web pages, and request processing.

Existing Web analytics solutions using both Web server log parsing and embedded external requests approaches provide several primary types of reports:

Aggregate data for a given time period (total number of page requests, number of requests for a specific page, most popular pages, etc.).
  The sequence of primary HTTP requests from a single user.
  A sequence of loosely defined actions and events, typically reported separately from the sequence of primary HTTP requests from a single user.

Web Server Log Parsing

One approach to capturing data for Web analytics engines is to parse Web server logs containing records of HTTP requests. Each time a Web client requests a resource, such as a Web page, from a Web server, the Web server logs various pieces of information about the request. A Web analytics engine parses these logs to generate reports. Logged information can include a timestamp, the requested URL, the IP address of the client, Web client details, and other information about the request and the Web client. Because logging occurs on the Web server, clients cannot subvert this approach to gathering Web analytics data, which provides relatively little detail about the user's actions other than the sequence of HTTP requests.

For example, a Web server logs a request from a Web client for the home page of a Web. The response includes references to a number of images, stylesheets, JavaScript, and other resources. The Web server may log each of these requests, though they provide little useful data for reporting purposes. The recorded URL of each request may contain query string parameters that the Web analytics server can use to determine additional information. When the user clicks a link in the Web page or causes the Web client to submit a post, the Web server logs the request, and can log requests for the resources referenced in the response.

All HTTP requests appear similar to the Web server. Other than the amount and specific information transmitted, there is little difference between a request for the home page, a request for an image or other resource referenced by the home page, and an AJAX request. The Web server logs all of these events in the same way, though it responds to these requests differently. It is the responsibility of the Web analytics engine to process the Web logs to generate meaningful reports.

Embedded External Requests

Another approach to capturing data for Web analytics is to cause the Web client to place external requests for tracking purposes. For example, a Web page could contain a reference to an image, either on the same Web server or another Web server that is also a Web analytics server. When the Web client requests the image, the Web analytics server logs or otherwise processes the request for Web analytics purposes. A Web page could also place external requests for JavaScript or other resources.

Events and JavaScript in Web components could also cause the Web client to send HTTP requests to a Web analytics server. For example, each page on a Web site could include JavaScript that executes whenever a Web client loads a page, or potentially while that page loads. This JavaScript causes the Web client to send an additional HTTP request to a Web analytics server either while the Web client is loading the page or after it completes loading the page. This HTTP request may include information such as the primary requested URL and information about the Web client. The Web server that receives the HTTP request updates a Web analytics database with details about the primary page request.

With AJAX, developers can use this approach to record actions other than page requests for Web analytics purposes. For example, in addition to associating Web analytics JavaScript logic with the Web client event that indicates that the page has loaded, a developer could associate Web analytics logic with the user's action of clicking on a Web component within a Web page. AJAX allows the developer to associate JavaScript to initiate HTTP requests to implement Web analytics functionality based on events. These solutions typically report actions separately from navigation.

Because users can disable JavaScript or use tools to block HTTP messages to Web analytics servers, users can circumvent this approach to gathering Web analytics data. Many solutions that embed Web analytics script in pages also rely on cookies, which users can also defeat.

The Web client industry, which includes Web browsers, is gaining increased focus on user privacy issues. Some of the new technologies being introduced allow users to browse Web sites while disabling all external requests to facilities such as Google Analytics, LeadLander, OmniTure, and other Web analytics and other solutions.

Today's Web analytics is essentially based on the paradigm that developers first build the Web site, and then adds the required code to enable Web analytics functionality afterwards.

Request Processing

Most modern Web servers respond to primary requests not with static content, but using a Web application server to execute logic to generate content dynamically. This logic can include calls to Web analytics APIs to pass information to the Web analytic server to track the primary request.

DESCRIPTION OF THE INVENTION

It is an object of embodiments of the invention to provide a method for collecting analytics data, wherein the collected data reflect the experience of a visitor browsing a Web site to a greater extent than prior art methods.

It is a further object of embodiments of the invention to provide a web analytics data collection engine which is capable of collecting data reflecting the experience of a visitor browsing a Web site to a greater extent than prior art data collection engines.

According to a first aspect the invention provides a method for collecting human experience analytics data for visitors browsing a Web site arranged on a web server, said web server comprising a web analytics engine, the method comprising the steps of:
  the web analytics engine registering an action performed by a visitor browsing the Web site,
  categorizing said registered action as a navigation action between web pages of the Web site and/or as an event action within a web page of the Web site, using the web analytics engine,
  in the case that the registered action is categorized as an event action, associating the event with a web page of the Web site and recording the action as an event within the associated web page, using the web analytics engine,
  in the case that the registered action is categorized as a navigation action, recording the action as a navigation from a current web page to a subsequent web page, or cancelling recording of the action, based on previously defined criteria, using the web analytics engine, and
  storing the recorded events and navigations in a data storage facility.

In the present context the term 'visitor' should be interpreted to be a person who is browsing a Web site, i.e. a person who is looking at, interacting with and/or navigating between web pages of the Web site.

The web site is arranged on a web server. As described above, the term 'web server' should, in the present context, be interpreted to mean a device that responds to requests placed over the Internet using web protocols. The web server may be in the form of a single server. As an alternative, the web server may include multiple virtual or physical machines.

The web server comprises a web analytics engine. In the present context the term 'web analytics engine' should be interpreted to mean an engine forming part of the web server and being arranged to collect information for analytical purposes.

According to the method of the invention a visitor browses the Web site. When the visitor performs an action this action is registered by the web analytics engine. The web analytics engine then investigates whether the registered action is a navigation action between web pages of the Web site, or whether it is an event action within a web page of the Web site. This investigation results in the registered action being categorized as either a navigation action or an event action. This registration is also performed by the web analytics engine. Examples of navigation actions include, but are not limited to, the visitor selecting a new page, the visitor performing an action which causes the current page to reload and the visitor activating a link to another web page of the Web site. Examples of event actions include, but are not limited to, a visitor clicking a button component and/or a multimedia component reaching the end of a video. It should be noted that the owner of the Web site may determine which kinds of actions should be categorized as navigation actions and which kinds of actions should be categorized as event actions.

In the case that the registered action has been categorized as an event action, the event is associated with a web page of the Web site, by means of the web analytics engine. It may be associated with the current web page, but another web page of the Web site may, alternatively, be chosen. This will be described further below. It should be noted that the owner of the Web site may determine which web page of the Web site a specific event may appropriately be associated with. Subsequently the web analytics engine records the action as an event within the associated web page.

On the other hand, in the case that the registered action is categorized as a navigation action, the nature of the navigation is further investigated by the web analytics engine. Based on this investigation, the action is either recorded as a navigation from a current web page to a subsequent action, i.e. a proper navigation, or the recording of the action is cancelled. Whether the action is recorded or cancelled depends on a set of criteria which has previously been defined by the owner of the Web site. The previously defined criteria may advantageously be selected in accordance with the experience of the visitor browsing the Web site. For instance, if the visitor experiences that he or she enters a new web page, then the navigation action may advantageously be recorded as a navigation from a current web page to a subsequent web page. If, on the other hand, the visitor experiences that he or she remains in the same web page, then recording of the navigation action may advantageously be cancelled. This may, e.g., be the case if the visitor has submitted a survey.

Finally, the recorded events and navigations are stored in a data storage facility. The data storage facility may form part of the web server. Alternatively, the data storage facility may be arranged on a separate server.

Thus, the method of the first aspect of the invention allows the owner of the Web site to collect and store data which reflects the human experience of visitors browsing the Web site. This provides valuable information to the owner of the Web site, e.g. regarding the behaviour of the visitor, the browsing pattern of the visitor, characteristics of the visitor, such as gender, preferences, political views, etc. The information may, e.g., be used for designing the Web site in order to attract and maintain visitors and/or for customizing information presented on the web page which is viewed by the visitor, e.g. in form of commercials or appetizers. Furthermore, the information is obtained solely within the Web site, i.e. without requiring any interaction with external sites, because the web analytics engine which performs the method steps forms part of the web server having the Web site arranged thereon.

The method may further comprise the step of recording the time and/or sequence of events occurring within a web page.

In the case that the time of occurrence of each event within a web page is recorded, the sequence of events is also inherently recorded. Furthermore, the time elapsing between the occurrences of the events is recorded in this case. As an alternative, only the sequence of events may be recorded, i.e. no information is recorded regarding the exact time of occurrence of a given event, and no information is recorded regarding the time elapsing between the occurrences. The sequence of the events within a web page as well as the time elapsing between the events within a web page may provide valuable information to the owner of the Web site about how the visitor experiences the Web site. For instance, the time and/or sequence of events may contain information regarding the priorities and/or preferences of the visitor, which may be of interest to the owner of the Web site.

According to one embodiment, a given event may be selectively associated with the current web page, a previous web page or a subsequent web page in a navigation sequence performed by the visitor. The owner of the Web site may determine which kinds of events should be associated with the current web page, which should be associated with a previous web page, and which should be associated with a subsequent web page. The selection of associated web page may advantageously be performed with due consideration to the experience of the visitor. Thus, the selected web page may advantageously be the one which the visitor would logically associate with the event. Thereby the recording of the event reflects the experience of the visitor.

The method may further comprise the step of updating a profile for the visitor based on the recorded events and navigations, and based on a set of profile keys and values assigned to each event action and navigation action. The profile for the visitor preferably reflects one or more characteristics of the visitor which the owner of the Web site is interested in knowing, e.g. in order to be able to adjust the design of the Web site or to customize information presented to the visitor. Such characteristics may, e.g., include political views, shopping habits, gender, regions of interest, visitor intention, etc. Certain actions performed by a visitor when browsing a Web site may provide a lot of information regarding such characteristics. Therefore, each action may be provided with a profile key and a value. When the visitor performs an action, the value of the action is added to the corresponding value key, and the profile is updated in accordance with the added value. It should be noted that a single action could provide information which is relevant to several profile keys, and a single action may therefore cause values to be added to several profile keys.

The step of updating a profile for the visitor may be performed in real time. In this case the updated profile may immediately be used for customizing information presented to the visitor, e.g. in form of appetizers, links, or commercials.

Profile keys in a profile may, e.g., be interpreted as a simple sum function, as a percentage (comparatively to other profile keys), or as an average, e.g. of how many times the profile key set has been updated.

The method may further comprise the steps of
  selecting one or more web page components based on the updated visitor profile, and
  displaying the selected component(s) on a web page being viewed by the visitor.

As described above, such components may be or comprise links, appetizers, regions of interest or commercials.

The step of updating a profile for a visitor may further comprise updating said profile based on the selected and displayed component(s).

The method may further comprise the step of analyzing the stored recorded events and navigations. Such an analysis may, e.g., be used by the owner of the Web site to adjust the design of the Web site in order to attract and maintain visitors, e.g. visitors having specific characteristics, such as having specific profiles. Alternatively or additionally, the analysis may be used for determining where to advertise in order to attract visitors.

The method may further comprise the step of providing information regarding analytics data pertaining to each web page of the Web site, based on said analysis. This may, e.g., allow the owner of the Web site to obtain information regarding which search terms a visitor is searching for on a given web page. Such information may be used for adjusting the content authoring process of the web page. Alternatively or additionally, the owner of the Web site may obtain information regarding which search terms led visitors to a given web page. Alternatively or additionally, the owner of the Web site may, according to this embodiment, be able to analyse which components visitors are interacting with on a given web page, and how they are interacting with those components.

The step of categorizing the registered action may be performed server-side in-process of the action on the basis of one or more categorization rules which have previously been programmed into the code of the Web site. According to this embodiment, the categorization of the registered action may be programmed into the code of the Web site during creation of the Web site. Thus, the categorization can, in this case, be programmed directly into the sever-side code instead of building it into the HTML code of the Web site. This is an advantage because it even further allows the owner of the Web site to customize the data collection in such a manner that the collected data reflects the experience of the visitor browsing the Web site.

According to a second aspect the invention provides a web analytics data collection engine comprising:
- means for registering and categorizing a user action as a navigation action between web pages of a Web site or as an event action within a web page of a Web site,
- means for selectively cancelling registration of a navigation action,
- means for associating a registered event with a web page of a Web site, and
- data storage facilities for storing registered events and navigations.

It should be noted that a person skilled in the art would readily recognise that any feature described in combination with the first aspect of the invention could also be combined with the second aspect of the invention, and vice versa.

The web analytics data engine of the second aspect of the invention may advantageously be used for performing the method of the first aspect of the invention. Thus, the means for registering and categorizing a user action may advantageously be adapted to perform the steps of registering an action performed by a visitor browsing the Web site and the step of categorizing said registered action as a navigation action between web pages of the Web site or as an event action within a web page of the Web site.

The means for selectively cancelling a registered navigation action may advantageously be adapted to perform the step of cancelling recording of a registered action based on previously defined criteria as described above.

The analytics data collection engine may form part of a web content management (WCM) system.

The means for associating a registered event with a web page may be adapted to associate the event with a current web page, a previous web page or a subsequent web page in a navigation sequence performed by a visitor.

The basic premise of the invention is to gather analytics data that is representative of the human experience of the Web site visitor rather than gathering information about sequences of HTTP requests.

Additionally, the idea of the invention is to integrate the Web analytics into the process of building and managing a Web site within a WCM. With this approach, there is no longer any need for Web log parsing or external URL calling.

This has the benefit of allowing privacy protecting technology that will shield the user against global surveillance such as Google analytics, but at the same time still allow the site owner to get detailed site statistics about users.

Because existing Web analytics solutions track primary HTTP requests or track events separately from primary requests, they do not provide sufficient semantic detail regarding the user's actions on a Web site. For example, if the user votes on a survey on a given page, resulting in a postback that refreshes the same page, then the user's intent is not to navigate twice to the same page as indicated by the sequence of HTTP requests. Rather, the human experience is that of performing a vote in a Web component in a single Web page instead of reporting actions as a sequence of requests for pages or other resources.

A user navigating from one page to another represents a certain type of user action that triggers the Web client to request a new Web page. A user interacting with a Web component in a Web page represents a different type of action, which occurs in the context of an existing Web page. The invention provides APIs allowing the developer to implement Web analytics tracking to report user actions within the context of a Web page. It also allow the WCM users to easily configure tracking behavior by means of the WCM.

While every Web page involves a primary HTTP request, not every primary request corresponds to a request for a new Web page. For example, a postback request often results from a user's interaction with a Web component in a Web page. The fact that an HTTP request occurs is an irrelevant artifact of the underlying HTTP technology. The request represents the user's action in a Web component rather than navigation between Web pages.

The postback request is a technical implementation that, when considered individually, does not describe the human experience of interacting with Web components within a sequence of Web pages. The user experiences interaction with a Web component rather than navigating twice to the same Web page, even if they notice the Web client refresh the Web page due to the postback.

While it is possible to parse and filter data tracked by Web analytics engines to report events within pages, existing approaches to Web analytics do not allow developers precise control over which user actions the system tracks or which pages to associate with those actions, nor do they allow developers to cancel tracking of a request.

Providing semantic data in Web analytics allows the site owner better understanding of the human experience of a given user visiting a Web site. This level of tracking provides for greater statistical analysis, such as when investigating the navigational patterns on the Web site. In addition to accessing analytics data cumulatively, such as the results of a survey, the invention allows the Web analytics user to access the data in semantic context, as the user experienced the Web site. Site optimization could benefit greatly from a review of semantic Web analytics data.

The invention provides a number of facilities to provide control over which user actions and system events to track, with which page to associate each event, the ability to cancel tracking of a primary request, and the ability to report a sequence of actions within each page in a sequence of pages.

The invention allows developers to implement Web analytics tracking functionality both declaratively and procedurally for events within Web pages and Web components. Developers can cause the Web analytics engine to report each event with a specific page in the user's navigation sequence.

As an example, a developer could associate the user action of submitting a survey with logic to cancel tracking of current page (a postback). The developer could associate the submit action with the previous page or the survey component on the previous page.

As another example, if a product page contains a search box that submits to a search page (a form post, not a postback), the developer could place logic in the search results page to associate the user's action of searching with the search component on the product page (the previous page). The developer could cancel tracking of the search results page (the current page), and associate the action of clicking any link to a search result (the next page) with the previous page with the search component on the previous page (the product page).

There is no exact formula for what represents the human experience, which is the responsibility of the site owner to define (i.e. the semantic interpretation of the experience).

The invention includes Web analytics reporting functionality presenting a hierarchy of numerous user actions and system events within pages and Web components in the user's navigational sequence.

The invention can store the events into a database or other data storage mechanism for later analysis.

The invention may parse Web server log files but is not required to do so. The invention could involve JavaScript or other scripting code that causes the Web client to generate HTTP messages, potentially including cookies, to a Web analytics engine when a page loads or when a user takes an action within a page or Web component, but is not required to do so. The invention could use facilities provided by the Web application server platform hosting the Web site to track user activity without cookies or JavaScript, in which case the user could not defeat these Web analytics features. The invention could use means other than processing Web server logs, external requests, and AJAX to track Web visitors, for example injecting a session identifier as a query string parameter in all URLs of the page.

The concept of Previous, Current, and Next pages can be thought of as a generic navigation sequence between Web pages. The previous page is −1, the current page is 0, the next page is +1; the page before the previous page is −2, etc.

According to the invention, each web page could be numbered in the sequence that they are shown to users. If that number is, e.g., embedded into the URL or domain name of each generated webpage, then this becomes a mechanism to detect if the user e.g. pressed the "back" button in his web-browser, or perhaps worked with multiple windows/"tab browsing". Detecting such behaviour could be used to register actions such as tab browsing and usage of back buttons. With this information the site owner can much more easily interpret the visitor's experience.

Profile Data

Because the invention includes the notion of building Web analytics and WCM functionality into a single platform, it is logical for the site owner to use the WCM to both manage the content that will be on the website as well as "profile data".

Profile data consists of a number of profiles each having a number of profile keys. A profile has a name. A profile key has a name and a value. A profile must have one or more profile keys.

For example:
Profile: Political Views
    Profile key: Democrat
    Profile key: Republican If the site owner uses the WCM to create a new poll that uses the invention, such as Which candidate do you prefer as the next president, then the site owner could configure that poll such that if the user selects the Obama option, the system modifies the profile key Democrat, while selecting the McCain would modify the profile key Republican. Or selecting Obama could modify both profile keys e.g. giving Democrat a more positive rating and giving Republican a more negative rating.

Likewise, the simple act of the user selecting a particular page could update the profile data. So if the web site contains articles of varying political views, the site owner could determine to increase/decrease the Democrat and Republican profile keys based on the pages visited (possibly combined with the amount of time spent on each such page)

In another example of profile data it could contain information about categories of user interest. For example:
Profile: Interest
    Profile key: Marketer
    Profile key: IT
    Profile key: Executive
Profile: Visit Value
    Profile key: Purchases
    Profile key: Marketing Value
    Profile key: Lead value Not all profile keys are set to one specific value or another. For example, the site owner could assign values to the individual Web pages, such that if a Web site visitor browses pages with content related to IT concepts, the system could increase a value associated with the profile key IT.

In an eCommerce site you typically would like to store information about purchases made by the user. This data could simply be stored in the profile key Purchases.

Since all the profile data is associated with the user's session on the website this data can be stored for later analysis by the site owner. Or can even be used real time to target specific advertisements, etc.

In another embodiment the profile key data could be used to indicate a virtual visit value to the marketing department allowing them to obtain detailed ROIs on Google Adword hits. And yet another profile key could be a lead value to the sales team, resulting in a Web analytics report that sorts customers by their level of interest as determined by the sales department.

All of this profile data is easy and natural to create, manage, and update within the WCM, and result in real time profiles updating as the user clicks through the Web site.

This in turn allows the WCM to serve personalized content to the site visitor in real-time, which the site owner also manages easily within the WCM.

When web pages are dynamic, they can have any number of pieces of content on them, from dynamic calls to action, multivariate test versions, recommended links and suggested content, etc. This is also a part of the human experience. These dynamic elements are present on the page, and influence and affect the user experience.

By taking into account which content is and is not shown on a personalized page, the profile keys can be modified based on this information, i.e. by taking into account the profile of each of the pieces of content selected to make up the entire page.

To summarize the differences between this invention and prior Web analytics solutions:
- The invention reports Web analytics as a navigational sequence of pages as experienced by the site visitor, listing zero or more events within each page in addition to the sequence of pages.
- The invention provides facilities for developers to cause specific events to appear in Web analytics data associated with specific pages in the user's navigation sequence, such as the current, previous, or next page. The invention allows developers to cancel tracking of what the Web analytics solution would otherwise report as a page impression.
- In addition to traditional Web server logs and JavaScript, the invention uses server-side logic, which calls the APIs provided by the invention to achieve tracking functionality.
- The invention allows the site owner to use the WCM tool to update profile data for user actions and navigation
- The WCM tool allows the site owner to specify which personalized information to present to Web site visitors based on profile data and analytics data.

Prior art Web analytics solutions reported a user's interaction with a Web site as a linear sequence of requests. Some provided APIs to report user actions and system events, but none reported the actions and events in the context of an existing Web page in a sequence of Web pages. None of the available solutions provided APIs to cancel tracking of the current page request. None of the available solutions provided APIs to associate events and event data with the previous, current, or next page.

Invention Application Programming Interfaces (APIs)

The invention provides two primary Application Programming Interfaces (APIs) that developers can use to achieve Web analytics functionality. It is noted that e.g. "Analytics.CancelNavigation( )" is just an abstract example of naming an API. It could have any name, form, programming language, etc. And could be more than one line of "API" code.

The API functions could essentially also be achieved by e.g. injecting parameters or codes into the URL and there the API as such does not need to be API calls in their traditional computer science meaning.

It is also noted that when the invention is used in the context of a WCM, the API can be used at the server side, rather than embedded as Ajax code into the web pages. This eases the development process.

Analytics.CancelNavigation( )

Developers can use the Analytics.CancelNavigation( ) API to cancel tracking of the current HTTP request. For example, a developer might use this method to cancel tracking of a postback request that actually represents an event in a Web page rather than a request for a new Web page.

The Analytics.CancelNavigation( ) API causes the Web analytics system to associate events recorded by subsequent uses of the Analytics.RegisterEvent( ) API (described in the next section) with the previous rather than the current primary HTTP request (or it can be thought of as the previous request being regarded as the current request).

Analytics.RegisterEvent( )

Developers can use the Analytics.RegisterEvent( ) API to associate any amount of information with a page, which page may be one of the following:
Page.Previous: The previous page (−1).
Page.Current: The current page (0).
Page.Next: The next page (+1).

The value passed to identify a specific page could be any number that identifies a page in the user's navigation sequence, relative to the current page.

Note that this description of the API is intentionally non-specific. In addition to specifying the page to associate with the event, the API allows the developer to specify the type of the event, such as different system events and user actions, as well as additional event information, such as data entered or selected by the user and other properties.

EXAMPLES

Scenarios

Developers can use the invention to enhance Web analytics in the following ways. These scenarios provide pseudo-code that approximates C#, but is otherwise intentionally ambiguous.

These scenario descriptions are intended to help to explain the invention, but the invention is in no way limited to these scenarios.

Cancel Postback Tracking

A common scenario for the Analytics.CancelNavigation( ) API is to cancel tracking of a request that does not contain new component impressions, such as a postback request.

As an example of this scenario:
1. The user of a Web client navigates to Web page A, which contains a survey Web component.
2. In Web page A, in the survey component, the user votes, generating a postback request for page A, which now contains the survey results.
3. The user clicks a link in Web page A to navigate to Web page B.

With a typical Web analytics solution, the Web analytics trail could be as follows:
1. Request for Web page A.
2. Request for Web page A.
3. Request for Web page B.

With the invention, the Web analytics trail could be as follows:
1. Web page A
   a. Action: Survey vote. User voted Barak Obama.
2. Web page B Most Web analytics solutions track all primary requests by default. In the case of a postback, the primary request is an irrelevant artifact of the underlying HTTP technology. It does not represent another user request for the same page, but the user's act of interacting with a Web component in an existing Web page.

The developer could use the following approximate API in the logic handling the survey component postback to cancel tracking of the page request, and associate the user's action of submitting the survey with the original Web page A, which the system now considers the current page:

Analytics.CancelNavigation( )
Analytics.RegisterEvent("Survey vote. User voted Barak Obama", Page.Current)

This API cancels tracking of the current primary HTTP request. The analytics system associates events reported subsequently and associated with the current page to be associated with the original page (now that the current page was cancelled).

Alternatively, the following API sequence could achieve the same result:

Analytics.RegisterEvent("Survey vote. User voted Barak Obama", Page.Previous)
Analytics.CancelNavigation( )

This API associates the user's action of submitting the poll with the original page request, and then cancels tracking of the postback request.

The invention clearly shows how the navigational sequence registered equals that of the human experience rather than that of the sequence of HTTP requests. Furthermore, the invention associates an action of the user under the page on which that action was performed by the user.

The site owner can thus now do detailed analysis of the navigational sequence experienced by the visitor. Likewise an editor in the WCM could for a given page see the components that users are interacting with on that page. And the site owner can e.g. do statistics on which pages polls are used, which polls, etc.

Code Example:
ASP.NET file:

```
protected override void OnLoad(object sender, EventArgs e) {
    if (!IsPostBack) {
        return;
    }
    if (Request.Form("Survey") != null) {
        RegisterSurveyVote(Request.Form("Survey"));
        return;
    }
}
private void RegisterSurveyVote(string vote) {
    Analytics.CancelNavigation( );
    Analytics.RegisterEvent("Action:Survey vote: User voted " + vote,
        Page.Current);
}
```

External Link

In this scenario:
1. A user accesses Web page A containing a link to Web page B on another Web site.
2. The user clicks on the link in Web page A to Web page B. The Web client requests and displays Web page B.

With a typical Web analytics solution, the Web analytics trail would be as follows:
1. Request for Web page A.

Many Web analytics solutions would not report the user's action of selecting the link to the external Web site. Some would allow the developer to track the user's action of selecting the link, but would not report that action as a sequence of actions within Web page A, but in a report of actions separate from the report of user navigation. If the external link was e.g. a local link to the website with a parameter for the global link to be redirected to then with the invention, the Web analytics trail could be as follows:
1. Web page A
    a. Action: External link. User clicked http://microsoft.com.

The developer could use the following approximate API to associate the user's action of selecting the link with Web analytics tracking functionality:
Analytics.CancelPage( ); // Don't register this local page, it will simply redirect to the external site
Analytics.RegisterEvent(ExternalLink, "Action: User clicked http:microsoft.com.",Page.Current)

Code Example:
Html file:

```
<a href="http://microsoft.com"
onclick="javascript:ajax.call('RegisterExternalLink',
'www.microsoft.com')">www.microsoft.com</a>
```

ASP.NET file:

```
protected void RegisterExternalLink(string url) {
    Analytics.CancelNavigation( );
    Analytics.RegisterEvent("Action:ExternalLink. User
clicked " + url, Page.Current);
}
```

Partial Form Completion

In this scenario:
1. A user accesses Web page A containing a Web form component.
2. The user enters some data into the Web form, but does not complete or submit the form.
3. The user clicks a link elsewhere in the page, activating Web page B.

With a typical Web analytics solution, the Web analytics trail would be as follows:
1. Request for Web page A.
2. Request for Web page B.

With the invention, the Web analytics trail could be as follows:
1. Web page A
    a. Action: User entered form data: "email address: email@address.com".
2. Web page B The developer could use the following approximate API to associate the user's action of entering data into the email field of the Web form component with appropriate Web analytics tracking functionality. In this example the site owner could e.g. use Ajax to transmit the field values when the user enters data into a field. The server side code could then look like:
Analytics.RegisterEvent(FormData, "Action: User entered form data: "email address: email@address.com", Page.Current)

As a result, the Web analytics system could report incomplete Web form entries.

Code Example:
Html file:

```
<input onchange="javascript:ajax.call('RegisterFormData', 'FieldName',
this.value)" />
```

ASP.NET file:

```
protected void RegisterFormData(string fieldName, string value) {
    Analytics.CancelNavigation( );
    Analytics.RegisterEvent("Action:User entered form data in " +
fieldName + ", value is " + value, Page.Current);
}
```

Download Binary Resource

In this scenario:
1. A user accesses Web page A containing a link to a binary resource to download.
2. The user selects the link and downloads the binary resource.

With a typical Web analytics solution, the Web analytics trail would be as follows:
1. Request for Web page A.
2. Request for binary resource (possibly).

Depending on configuration, a Web analytics solution that parses Web logs could automatically report access to the binary resource. Because a binary resource cannot contain or reference JavaScript, the developer must configure a Web analytics solution that uses JavaScript to track the user action of downloading. The report of the download would not appear in the context of Web page A, but in a separate report.

With the invention, the Web analytics trail could be as follows:
1. Web page A
   a. Action: User downloaded. Binary resource: screensaver.zip.

The developer could associate the user's action of clicking the link to download the binary resource with Web page A using the following API:

Analytics. RegisterEvent("Action: User downloaded. Binary resource: screensaver.zip", Page.Current)

Depending on the particular server side implementation it may be necessary to associate this event with the previous page.

Contextual Information
In this scenario:
1. The user of a Web client navigates to Web page A, which contains both a survey Web component and a search Web component.
2. In Web page A, in the survey component, the user votes, generating a postback request for Web page A, which now displays the survey results.
3. In Web page A, in the search component, the user performs a search, generating a form post to the search results page C, which contains search results.
4. In Web page C, the visitor clicks the second search result and navigates to Web page D.

With a common Web analytics solution, the Web analytics trail would be as follows:
1. Request for Web page A.
2. Request for Web page A.
3. Request Web page C (search results).
4. Request for Web page D.

With the invention, the Web analytics report could be as follows:
1. Web page A
   a. Action: Survey vote. User voted "Barak Obama".
   b. Action: Search. Search term: "President".
2. Web Page C
   a. Info: User searched for "President"
   b. Action: Follow search hit. User clicked search hit 2, Bush.
3. Web page D
   a. Action: User came to this page after searching for president and following hit 2, "Bush".

The developer could use the following approximate API in the logic that handles the postback of the survey Web component to cancel tracking of the postback request for Web page A:

Analytics.CancelNavigation( )

This API cancels Web analytics tracking for the current (postback) page request. The postback request for Web page A is an irrelevant artifact of the underlying HTTP technology. It does not represent another request by the user for the same Web page, but the user's act of responding to the survey in the original page, which the Web analytics engine continues to consider the current page because of calling the API to cancel reporting of the current page request.

The developer could use the following approximate API in the logic of the component that handles the user's action for submitting the survey with the following API to report that action in the context of the current Web page A:

Analytics. RegisterEvent(Poll, plNextPresident, "Barak Obama"; Page.Current)

This API registers the user's act of submitting the survey with the current page, which in the Web analytics system now represents the original request for Web page A.

The user now searches for "president" and the form post sends the user to the search results page C. The APIs no page C could be called like this to store relevant information on the relevant pages:

Analytics.RegisterEvent(Action, Search, null, "President"; Page.Previous)

Analytics.RegisterEvent(Info, Search, null, "President"; Page.Current)

When the user selects the second search hit, its presumed that the URL contains information that can trigger server side code which calls the following approximate APIs:

Analytics.RegisterEvent(Action, Search, Follow-hit, "#2"; Page.Previous)

Analytics.RegisterEvent(Info, Search, Follow-hit, "User came to this page by following hit #2 while searching for president"; Page.Current)

Thus, these calls would result in the analytics registering the following result.
1. Web page A
   a. Action: Survey vote. User voted "Barak Obama".
   b. Action: Search. Search term: "President".
2. Web Page C
   a. Info: User searched for "President"
   b. Action: Follow search hit. User clicked search hit 2, Bush.
3. Web page D
   a. Action: User came to this page after searching for president and following hit 2, "Bush".

This is clearly immensely more valuable to the site owner than the traditional analytics methodologies. It is of course up to the site owner how to store this data for later analysis. The advantage of storing the data within all the pages in the example above, is that when a page owner analyzes her particular page, it becomes much clearer how people got to the page, and understanding this, also helps the page owner understand how to improve the page, and why people then act the way they do.

Code Example:
ASP.NET file:

```
protected override void OnLoad(object sender, EventArgs e) {
   if (!IsPostBack) {
      return;
   }
   if (Request.Form("Survey") != null) {
      RegisterSurveyVote(Request.Form("Survey"));
      return;
   }
   if (Request.Form("Search") != null) {
      RegisterSearch(Request.Form("Search"));
      return;
   }
}
private void RegisterSurveyVote(string vote) {
   Analytics.CancelNavigation( );
   Analytics.RegisterEvent("Action:Survey vote: User voted " + vote, Page.Current);
}
private void RegisterSearch(string search) {
   Hit[ ] hits = PerformSearch(search);
   RenderHits(hits);
```

-continued

```
    Analytics.CancelNavigation( );
    Analytics.RegisterEvent("Action:Search. Search term " + search + ",
hits: " + hits.Length, Page.Current);
}
```

ASP.NET file 2:

```
protected override void OnLoad(object sender, EventArgs e) {
   if (IsPostBack) {
      return;
   }
   if (Request.QueryString("isfollowhit") != null) {
      Analytics.RegisterEvent("Action:Follow Search Hit. User clicked
search hit: " + Request.QueryString("isfollowhit"), Page.Current);
   }
}
```

User Comment Submission
   In this scenario:
   1. The user accesses Web page A, which contains a blog entry, forum post, or other content.
   2. The user activates a Web component in Web page A that allows them to enter a comment about the content of Web page A.
   3. The user enters their comment.
   4. The user previews their comment.
   5. The user commits his/her comment to the system. The Web client returns to Web page A.
   If the Web site implements the comment entry functionality without using postbacks, a typical Web analytics solution could report this scenario as follows:
   1. Request for Web page A.
   2. Request for Web page B (comment entry).
   3. Request for Web page C (comment preview).
   4. Request for Web page A.
   If the Web site implements the comment entry functionality using postbacks, a typical Web analytics solution could report this scenario as follows:
   1. Request for Web page A.
   2. Request for Web page A.
   3. Request for Web page A.
   4. Request for Web page A.
   With the invention, the Web analytics report could appear as follows:
   1. Web page A
      a. Action: Create comment.
      b. Action: Enter comment: Excellent post
      c. Action: Preview comment.
      d. Action: Commit comment.
   If the Web site implements the comment entry functionality using postbacks, the developer could use the following approximate API in the logic that handles the user's action of creating a comment:
Analytics.CancelNavigation( )
Analytics.RegisterEvent("Create comment", Page.Current)
   This API cancels Web analytics tracking for the current page request (a postback representing the user's action of creating a comment), instead tracking the action of creating the comment as an event within the current page.
   In the logic that handles the user's action of entering the comment:
Analytics. RegisterEvent("Enter comment: Excellent post", Page.Current)
   This API tracks the user's action of entering the comment as an event within the current page.

In the logic that handles the user's action of previewing the comment:
Analytics.CancelNavigation( )
Analytics.RegisterEvent("Preview comment", Page.Current)
   This API cancels Web analytics tracking for the current page request (a postback representing the user's action of previewing their comment), instead tracking the action of previewing the comment as an event within the current page.
   In the logic that handles the user's action of committing the comment:
Analytics.CancelNavigation( )
Analytics.RegisterEvent("Commit comment", Page.Current)
   This API cancels Web analytics tracking for the current page request (a postback representing the user's action of committing the comment), instead tracking the action of committing the comment as an event within the current page.
User Navigates to the Same Web Page Twice
   Web analytics users may want to know if a user of the Web site clicks on a link to a page when they are already viewing that page.
   In this scenario:
   1. The user accesses Web page A, which contains a link to Web page A.
   2. The user clicks on the link to Web page A. The Web client reloads Web page A.
   A typical Web analytics solution would report this scenario as follows:
   1. Request for Web page A.
   2. Request for Web page A.
   A solution using the invention could report this scenario as follows:
   1. Request for Web page A
      a. Action: User selects link to same page.
   The developer could achieve this functionality using the following approximate API in the component responsible for determining that the user has selected a link to the same page:
Analytics.CancelNavigation( )
Analytics.RegisterEvent("User selects link to same page."; Page.Current)
   This API cancels Web analytics tracking for the current page request, which represents an action within a Web page rather than a request for a new Web page.
   This may not necessarily represent the site owner's desired reporting output. The human experience could arguably be described as either an action within a page, or a sequence of page requests. Another desired output could be to register this sequence:
   1. Request for Web page A
      a. Warning: User chose link to this page.
   2. Request for Web page A
   Which would simply be obtained though the API:
Analytics.RegisterEvent(Warning, "User chose link to this page."; Page. Previous)
Search Hit
   In this scenario:
   1. The user accesses Web page A containing a list of search results (hits).
   2. The user selects the second search hit in the list, which links to Web page B.
   3. The Web client loads Web page B.
   A typical Web analytics solution might report this scenario as follows:
   1. Request for Web page A
   2. Request for Web page B Using the invention, the solution might report this scenario as follows:
1. Web page A
   a. Action: User selects search hit 2, Bush.
2. Web page B
   a. Comment: User arrived after searching for president and following search hit 2, Bush.

The developer could use the following APIs in the logic that handles the user's action of selecting the search hit to implement this Web analytics functionality:

Analytics.RegisterEvent(Action, "User selects search hit 2, Bush.", Page.Previous)
Analytics.RegisterEvent(Comment, "User arrived after searching for president and following search hit 2, Bush", Page.Current)

Code Example:
ASP.NET file:

```
protected override void OnLoad(object sender, EventArgs e) {
    if (!IsPostBack) {
        return;
    }
    if (Request.Form("Search") != null) {
        RegisterSearch(Request.Form("Search"));
        return;
    }
}
private void RegisterSearch(string search) {
    Hit[ ] hits = PerformSearch(search);
    RenderHits(hits);
    Analytics.CancelNavigation( );
    Analytics.RegisterEvent("Action:Search. Search term " + search + ", hits: " + hits.Length, Page.Current);
}
```

ASP.NET file 2:

```
protected override void OnLoad(object sender, EventArgs e) {
    if (IsPostBack) {
        return;
    }
    if (Request.QueryString("isfollowhit") != null) {
        Analytics.RegisterEvent("Comment: User arrived after searching for " + Request.QueryString("isfollowhit"), Page.Current);
    }
}
```

Search Component Hit

In this scenario, every page on the Web site contains a search component. When the user searches using this component, the Web client posts that search query to another page, which displays search results. The Web analytics user is typically interested in the fact that the user searched from the original Web page, not the fact that they accessed the search results page.

In this scenario:
1. The user accesses Web page A containing a search component.
2. In Web page A, the user uses the search component.
3. The Web client loads Web page B containing a list of search results (hits).
4. In Web page B, the user selects the second search hit in the list, which links to Web page C.
5. The Web client loads Web page C.

A typical Web analytics solution might report this scenario as follows:
1. Request for Web page A.
2. Request for Web page B.
3. Request for Web page C.

Using the invention, the solution might report this scenario as follows:
1. Web page A
   a. Action: User searches for president.
   b. Action: User selects search hit 2, Bush.
2. Web page C
   a. Comment: User arrived after searching for president and following search hit 2, Bush, from Web page A.

The developer could use the following approximate API within the logic for Web page B to prevent Web analytics tracking of the request for Web page B:
Analytics.CancelNavigation( )

The developer could use the following approximate API within the logic for Web page B to report the user searching within Web page A, which the Web analytics system now considers the current page:
Analytics.RegisterEvent("User searches for president", Page.Current)

The developer could use the following API in the logic for generating Web page B to provide contextual information to the Web analytics user reviewing the report of the user's activity on Web page C:
Analytics.RegisterEvent("User arrived after searching for president and following search hit 2, Bush, from Web page A.", Page.Next)

The developer could use the following approximate API in the logic for generating Web page C to report the user selecting the search hit as an action within Web page A:
Analytics.RegisterEvent("User selects search hit 2, Bush", Page.Previous)

Again, this may not necessarily represent the site owner's desired reporting output. The human experience could arguably be described differently. But by means of the API, any interpretation of the human experience is allowed.

Multimedia

In this scenario:
1. The user accesses Web page A, which contains a multimedia video component.
2. The user selects the play button in the video component.
3. The video reaches its conclusion.
4. The user selects a link to Web page B in Web page A. The Web client loads Web page B.

A typical Web analytics solution might report this scenario as follows:
1. Web page A.
2. Web page B.

A developer could use the invention to cause the Web analytics solution to report this scenario as follows:
1. Web page A
   a. Action: User presses Play.
   b. Event: Video reaches conclusion.

The developer could use the approximate API in the logic that handles the event of the user pressing play to report this action for Web analytics:
Analytics.RegisterEvent("User selects search hit 2, Bush", Page.Current)

The developer could use the following approximate API in the logic that handles the event of the video reaching its conclusion to report this action for Web analytics:

Analytics.RegisterEvent("Event: Video reaches conclusion", Page.Current)

DESCRIPTION OF THE DRAWINGS

FIG. 1 shows an example of a WCM where the editor is looking at the content associated with a particular page on the website. The user has chosen the analytics menu and will click on the "Assign" button in order to update profile data.

FIG. 2 illustrates profile data update. On the content in the screenshot of FIG. 1, the dialogue shown in FIG. 2 allows the user to set how the WCM should update values for each profile key as a web site visitor visits this page (this could also have been setting profile data on a poll option for Obama).

FIG. 3 also illustrates profile data. The screen of FIG. 3 simply shows a system field that says that on this particular piece of content, the profile Gender will have profile key Male added by 1 and have the profile Visit Value profile key Value added by 100.

Figure 1:
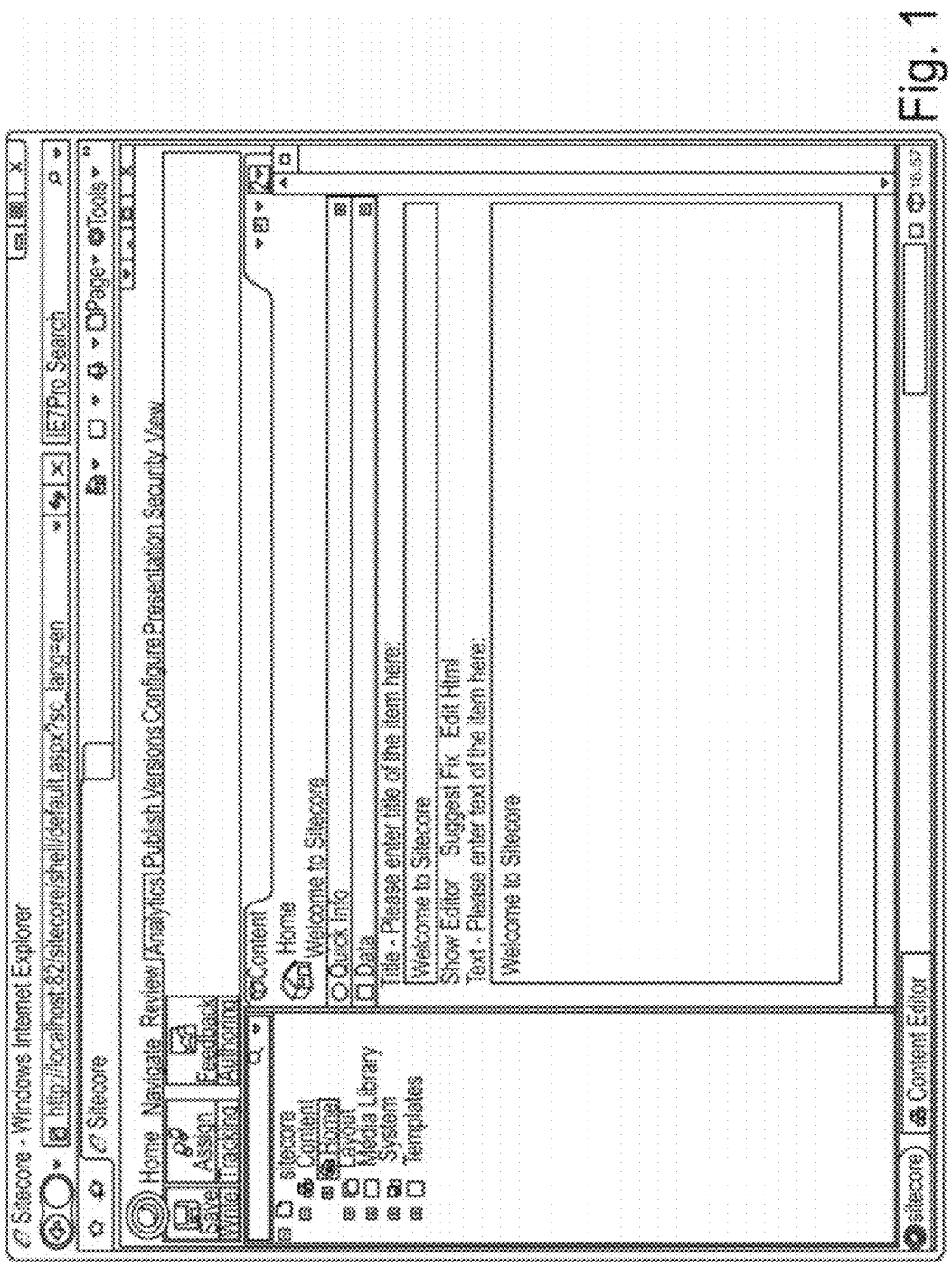
FIGS. 1-14 are screenshots illustrating embodiments of the method and the web analytics data collection engine of the invention.
Figure 2:
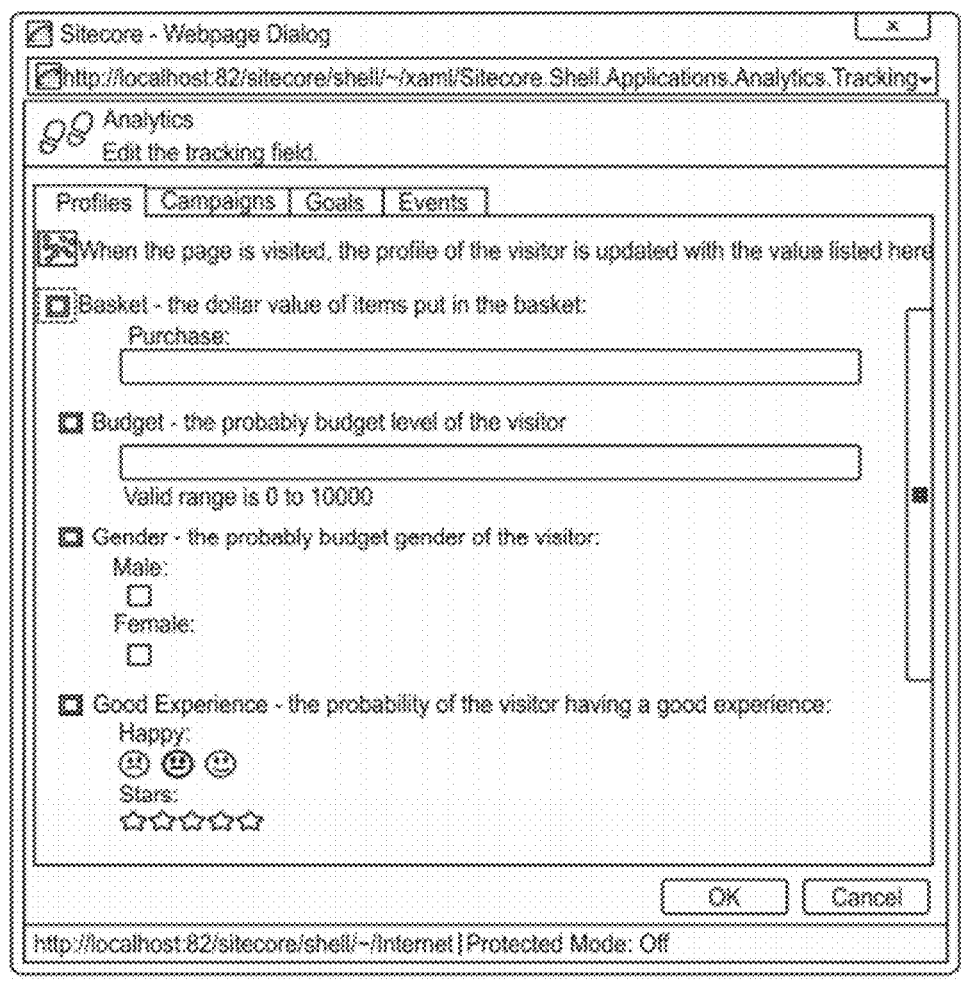
Figure 3:
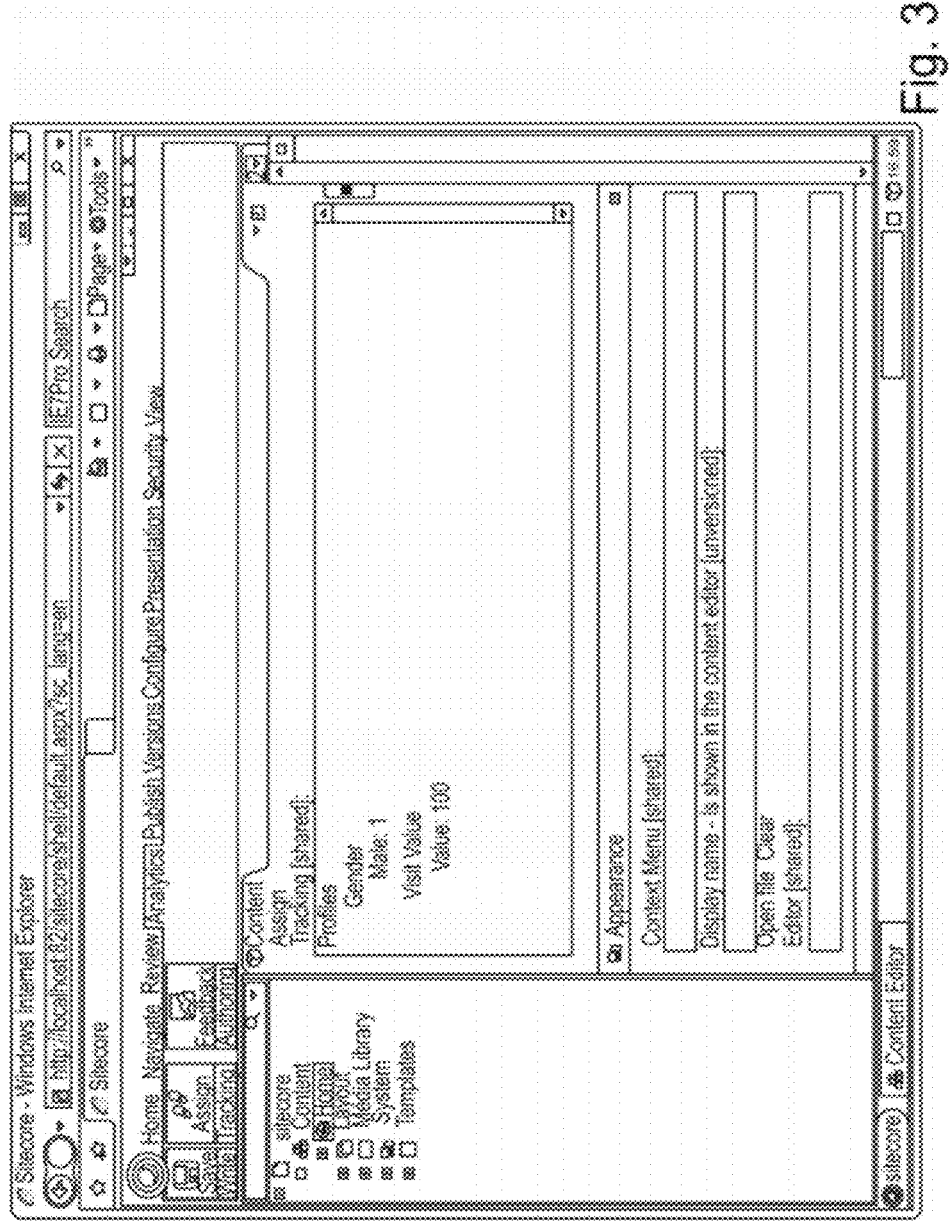
Figure 4:
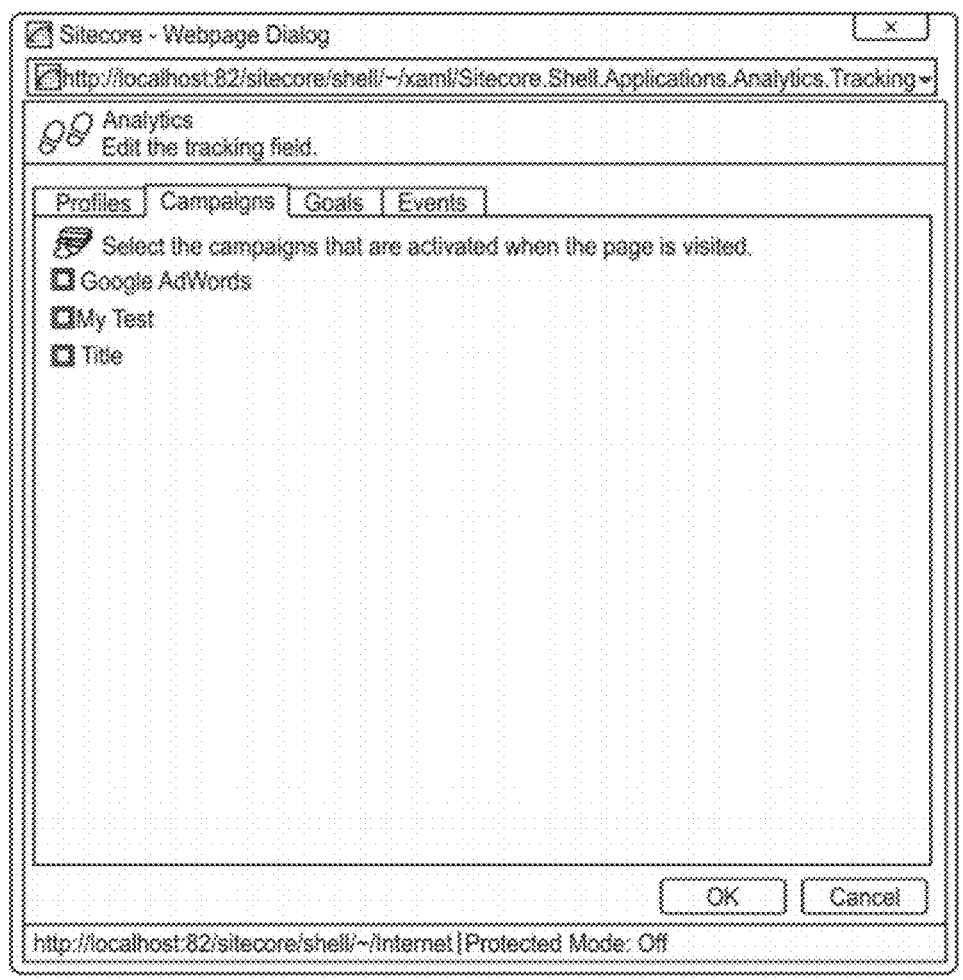

In the screenshot of FIG. 4 the WCM user can associate a visitor action with enrolling the visitor into a campaign. This could for example be set on a landing page from Google Adwords. The campaign could also be trigged though means of an API call of by means of e.g. a URL parameter.

Figure 5:
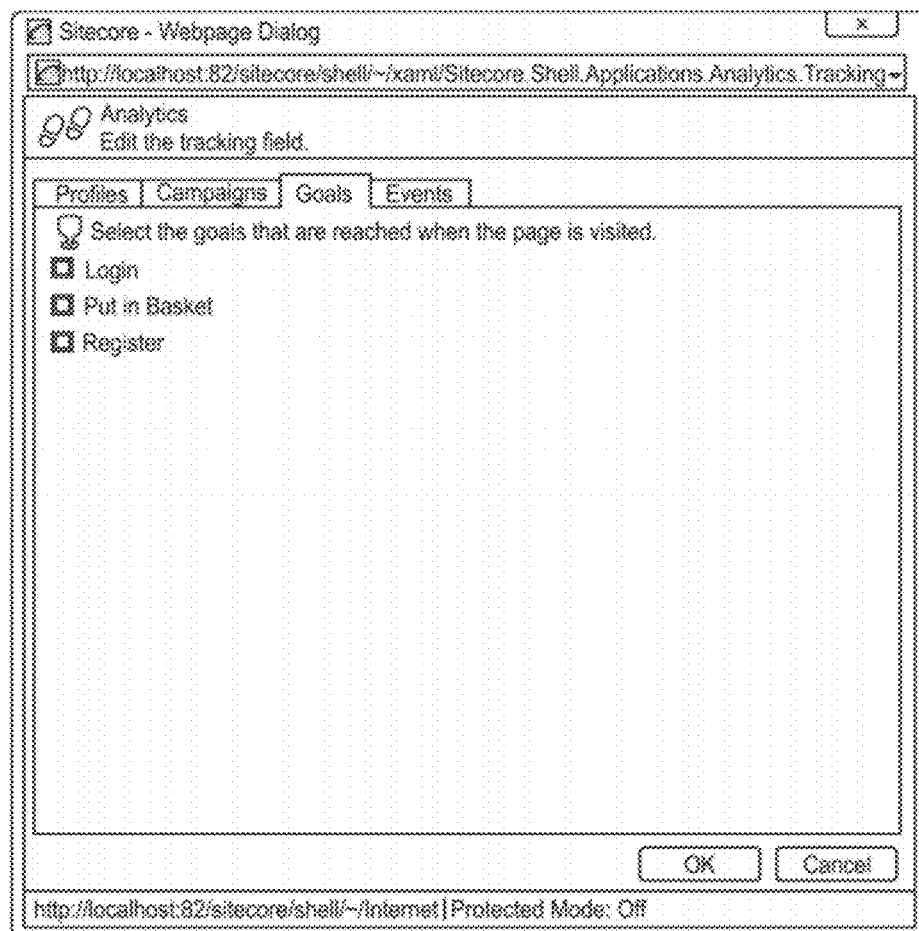

FIG. 5 illustrates goals. This allows the WCM user to associate a goal with a given piece of content (e.g. a web page). The goal could also be trigged though means of an API call of by means of e.g. a URL parameter.

Figure 6:
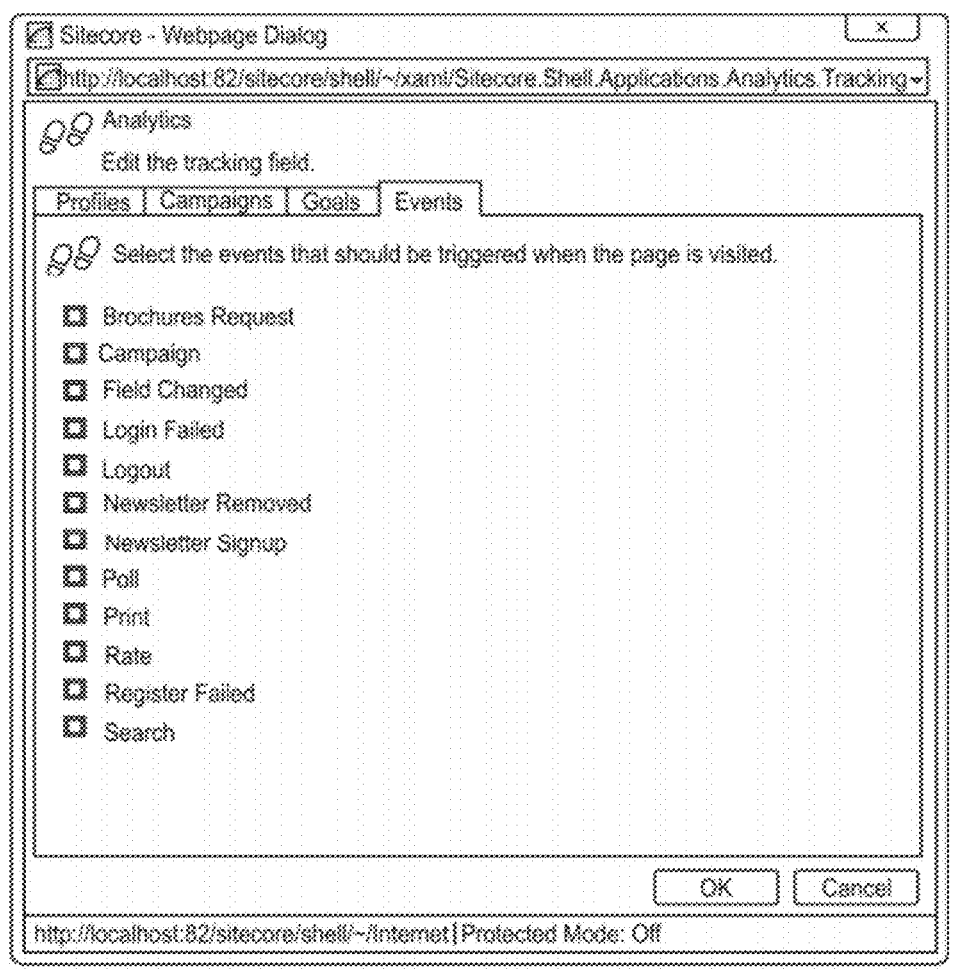

FIG. 6 illustrates events. This allows the WCM user to associate any arbitrary event with a given piece of content (e.g. a web page). The event could also be trigged though means of an API call or by means of e.g. a URL parameter.

Figure 7:
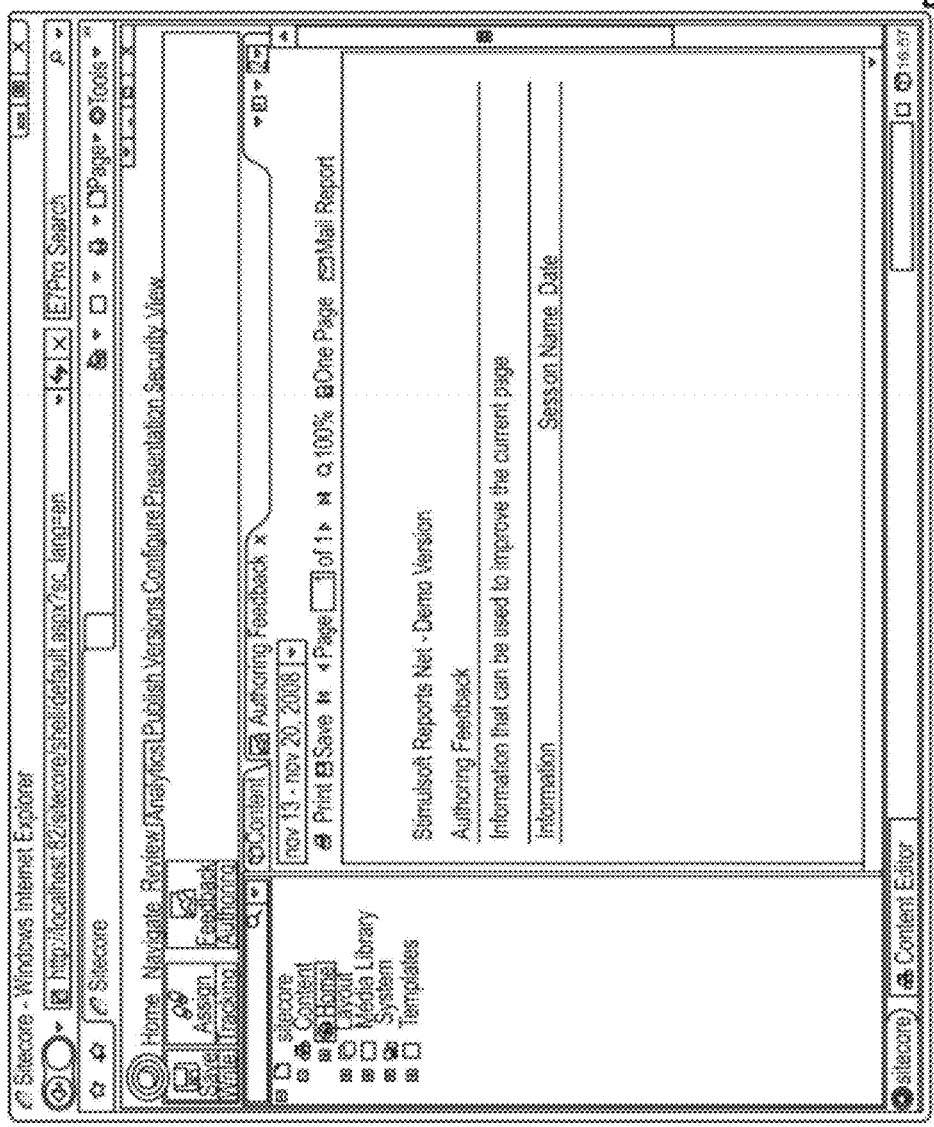

FIG. 7 illustrates authoring feedback. In this example the WCM editor has, for a piece of content, received a report showing what kind of actions users have taken on that page. Although the screenshot does not show any actions, it could be information such as what search terms led the user to this page, or which search terms the user has used on this page. Or even which polls users have voted for on this page. Or even page feedback.

Figure 8:
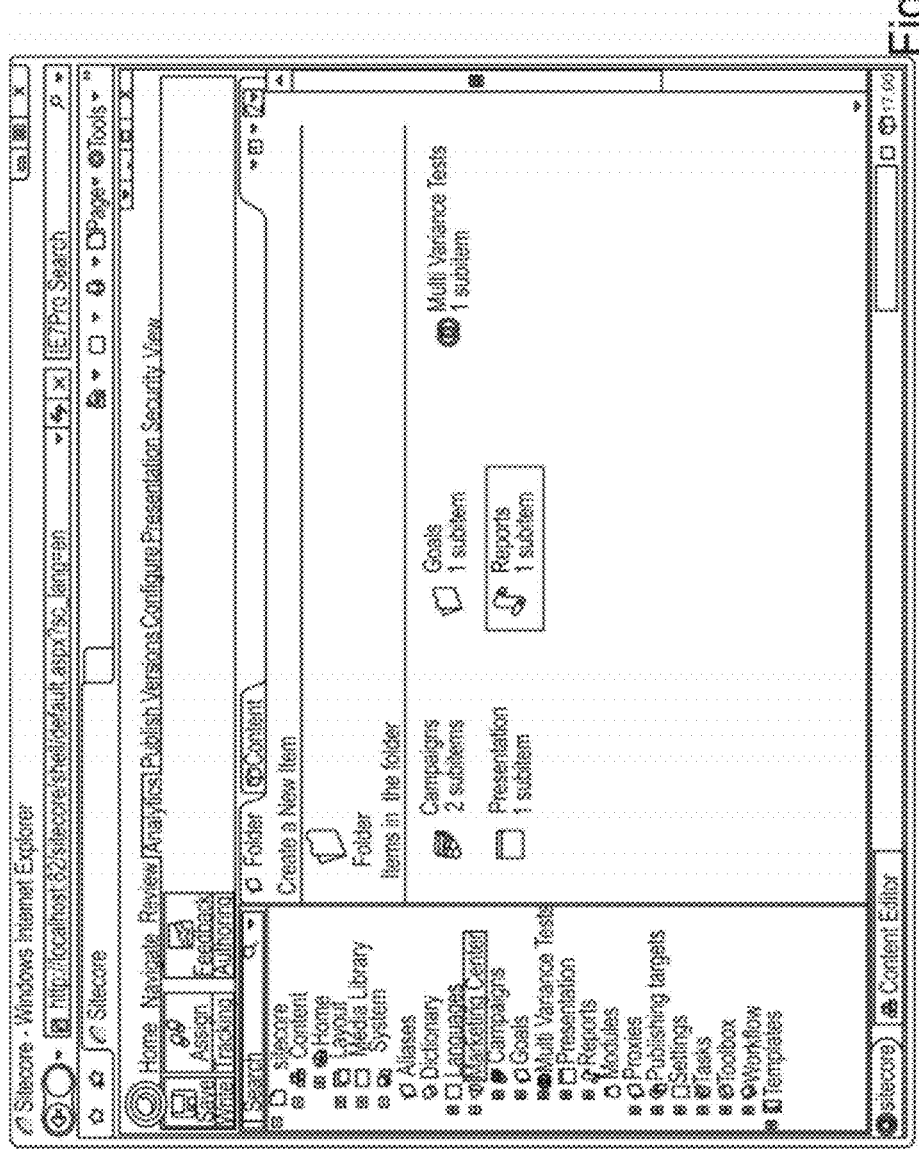

FIG. 8 illustrates a marketing centre. The marketing centre from within the WCM could, e.g., allow the WCM users access to defining Campaigns, Goals, MV Tests, Reports, and real-time personalized Presentation.

Figure 9:
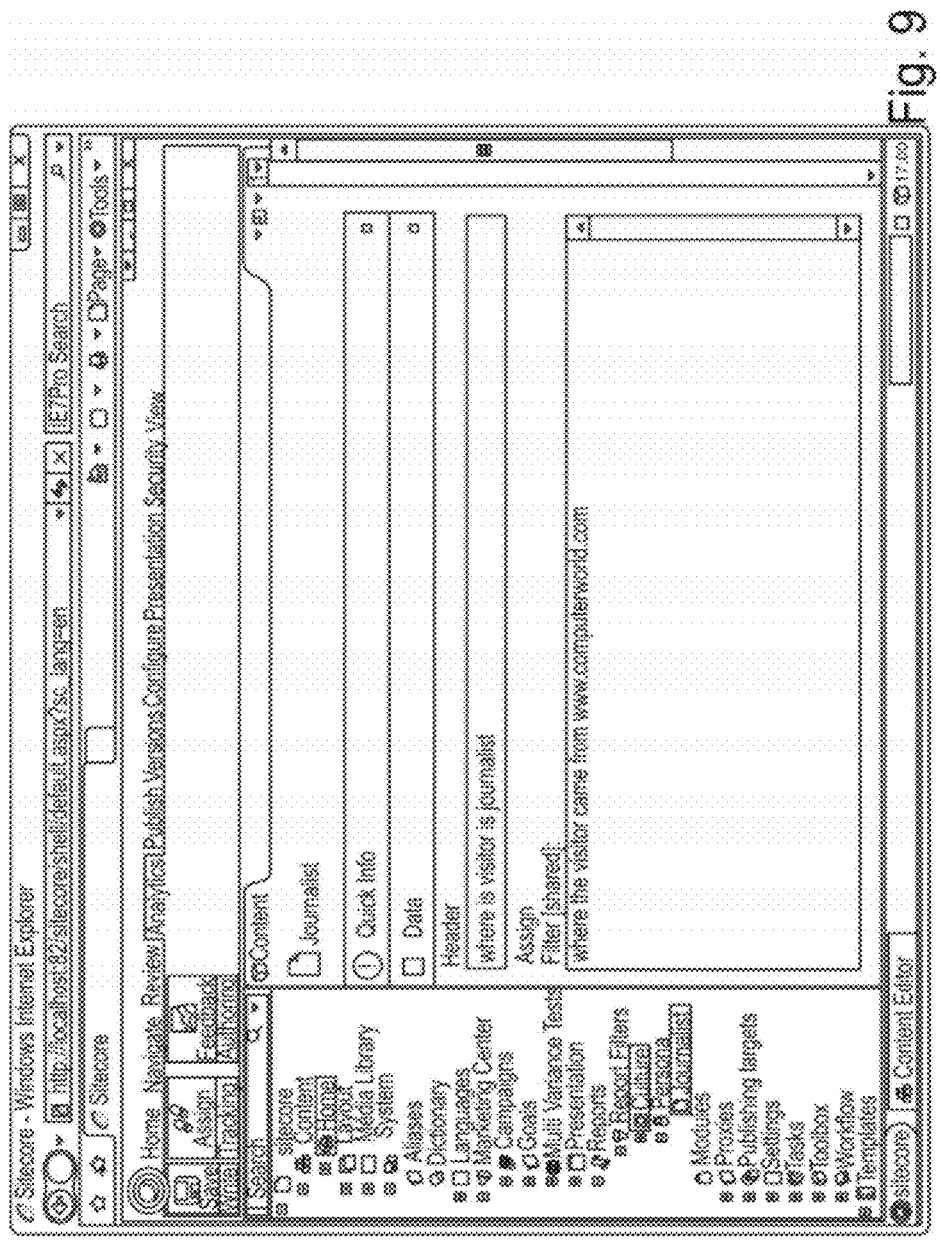

FIG. 9 illustrates defining a rule. This is an example of defining a rule which says that if a visitor came from the domain www.computerworld.com the visitor can be considered to be a journalist persona.

Figure 10:
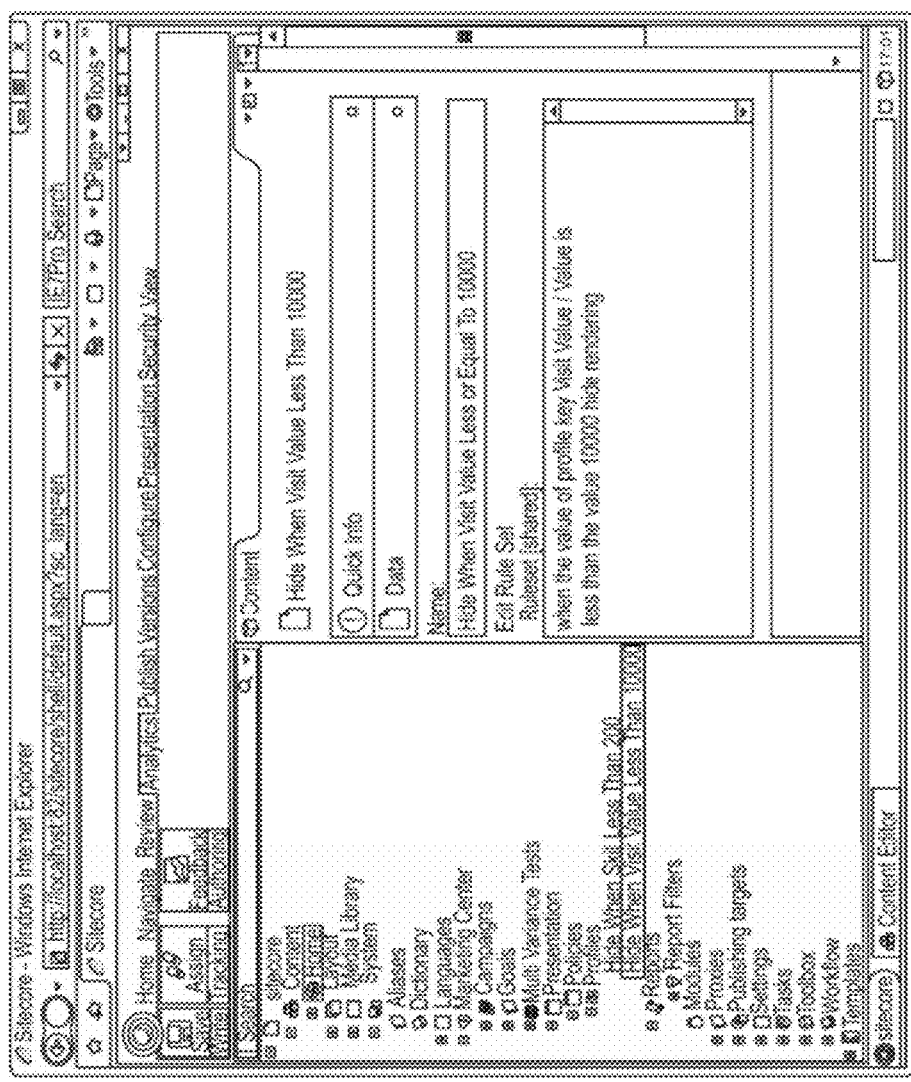

FIG. 10 illustrates more rules. The screenshot of FIG. 10 shows a rule that will hide a component on the web site as long as the profile "Visit Value" profile key "Value" is less than 10,000. Such rules are excellent for quickly making very targeted personalized web experiences.

Figure 11:
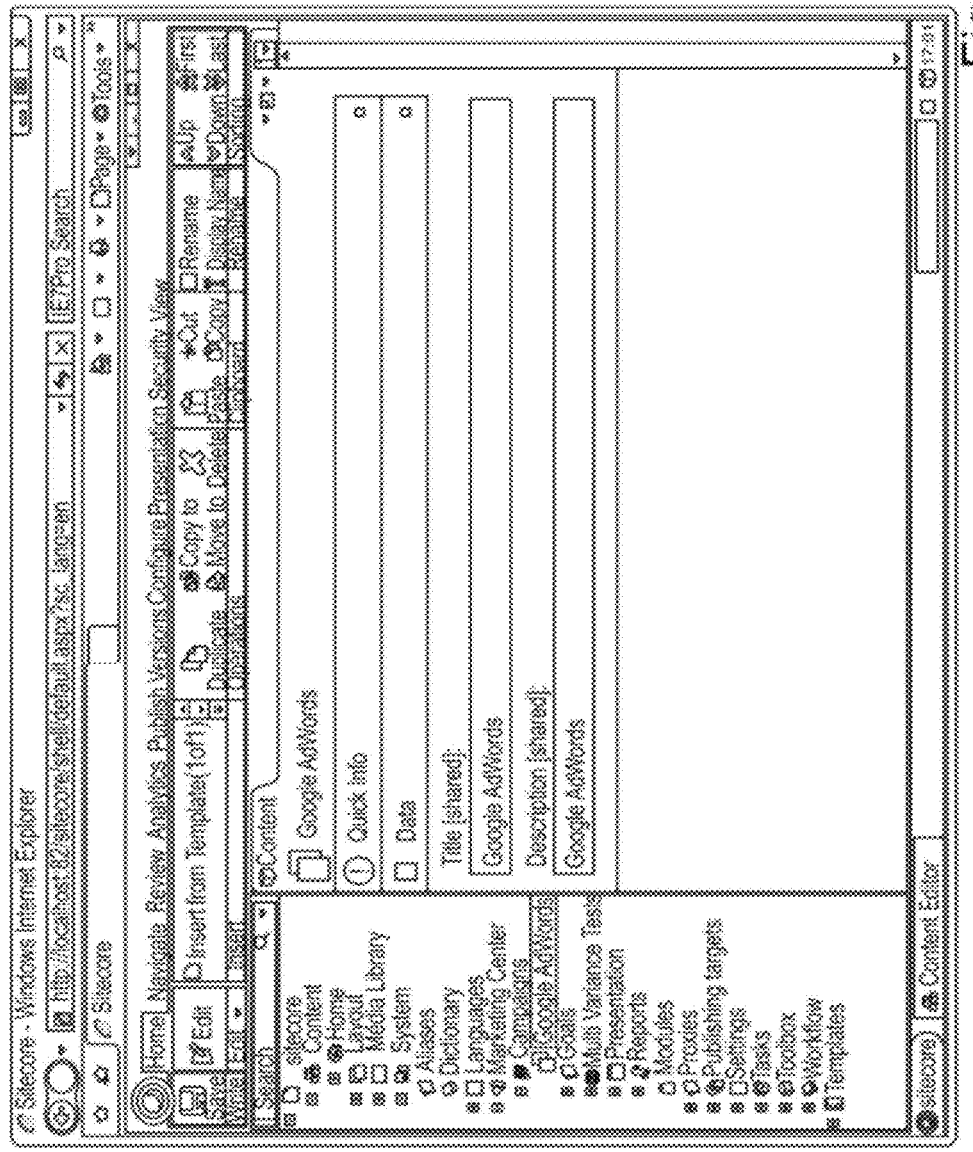

FIG. 11 shows a (mini) campaign.

Figure 12:
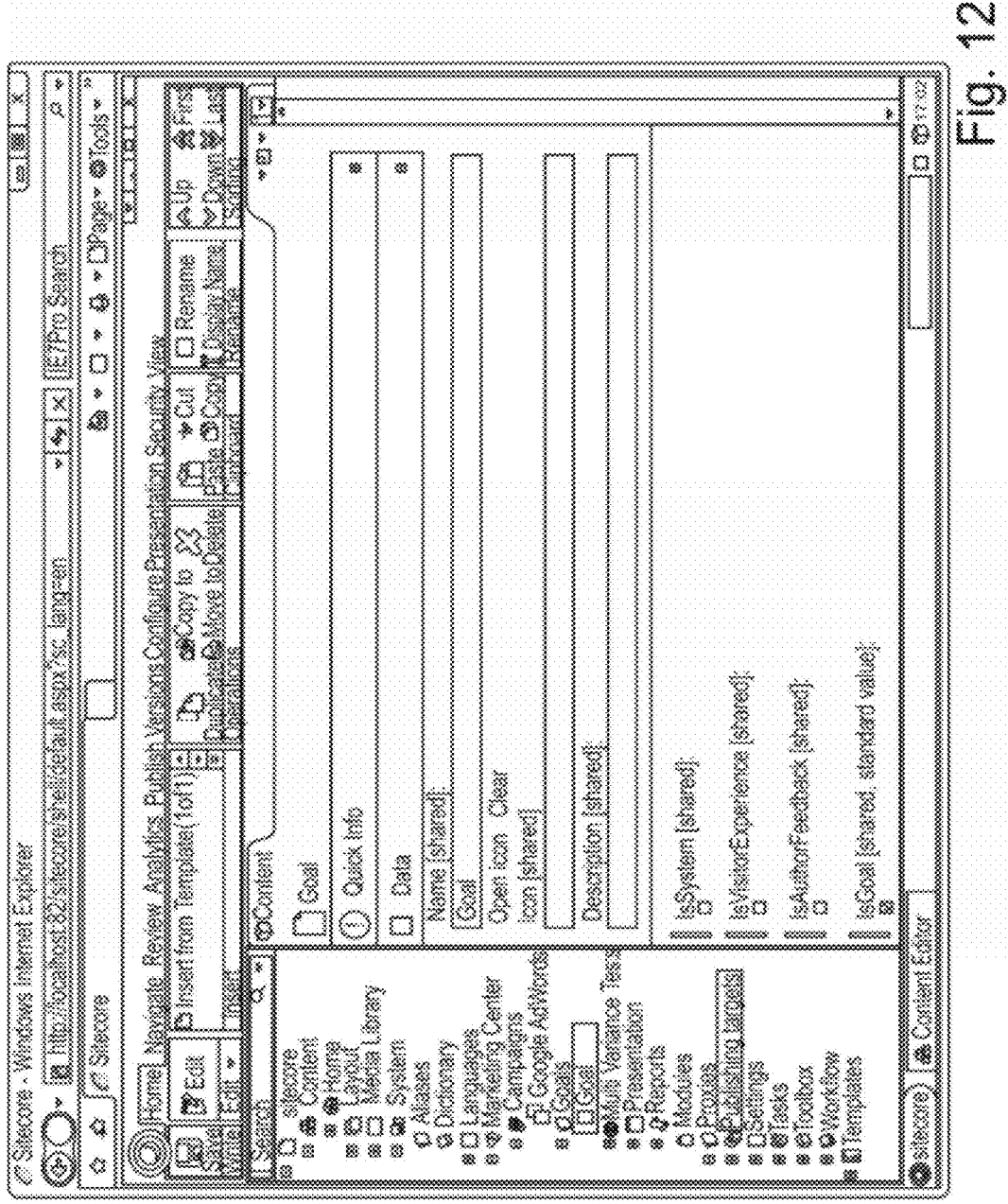

FIG. 12 shows how the marketer could define a goal.

Figure 13:
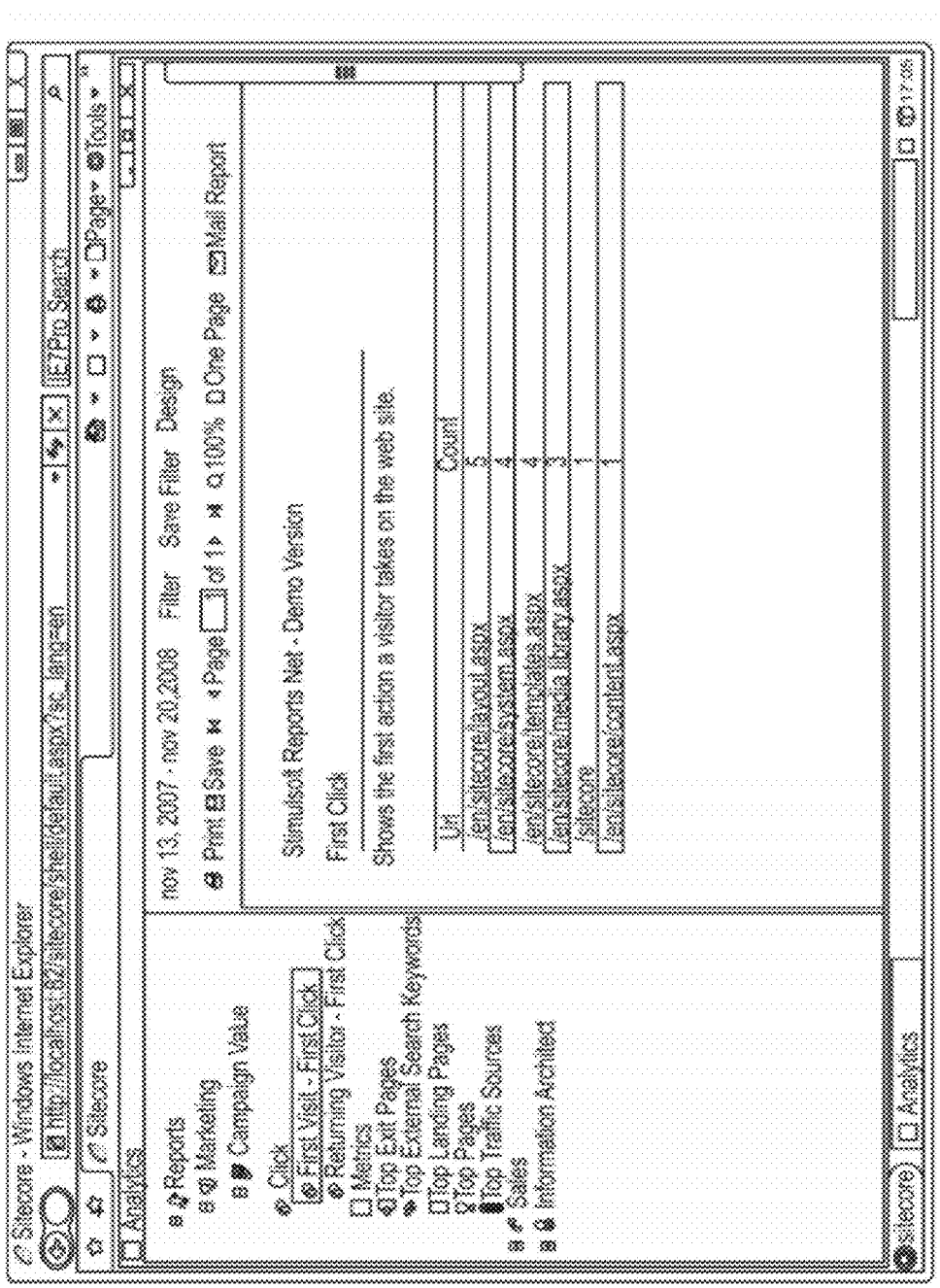

FIG. 13 illustrates a first click report. The page of FIG. 13 shows a report that for a given page on the Web site shows which link the visitor has clicked on. By applying rules the report could be filtered to show e.g. "what do new Web site visitors click on the first time they see the home page". The kind of question any marketing manager should be asking himself, but strangely enough not something any analytics system today can answer.

Figure 14:
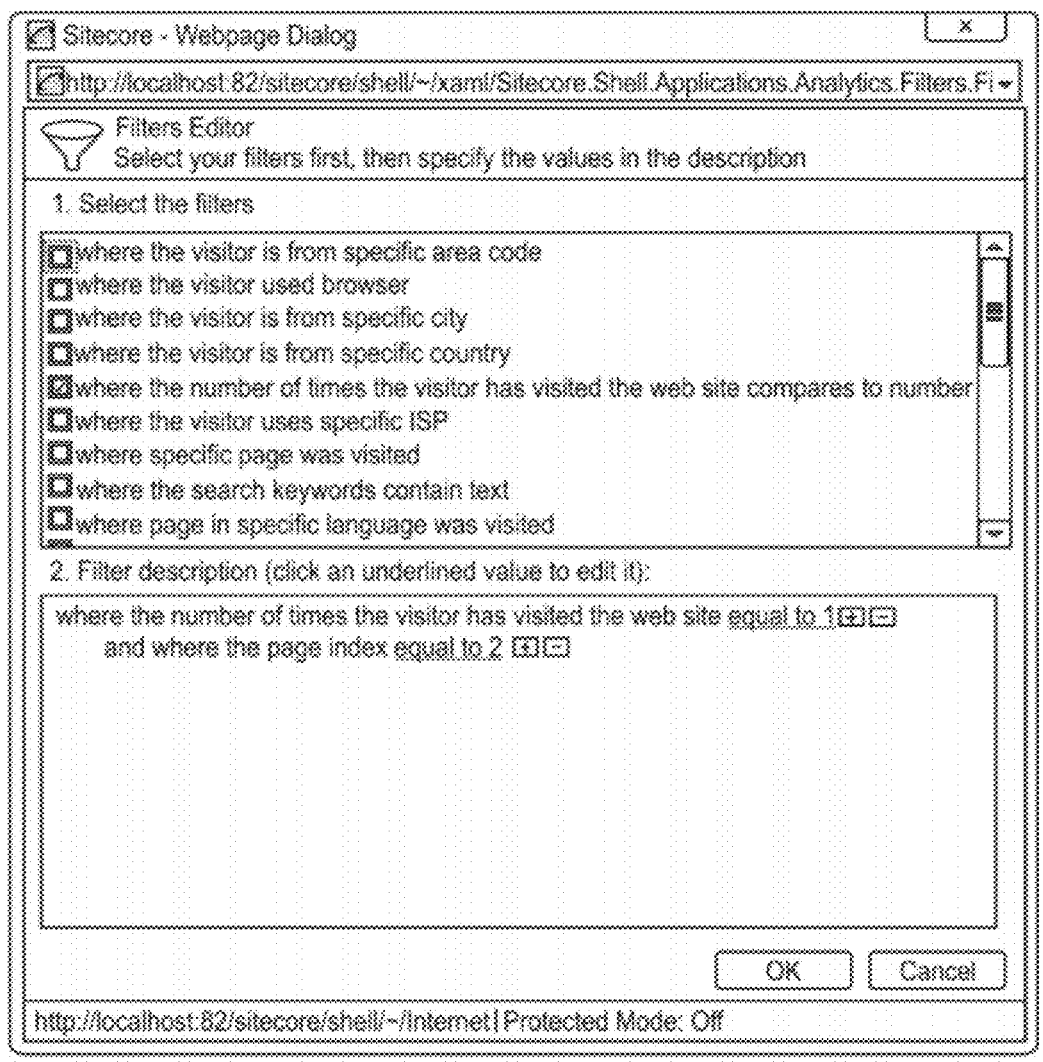

FIG. 14 illustrates a filter editor. The screenshot of FIG. 14 shows how you can setup report filters. This is the kind of filter that is needed to generate the report in the previous example.

The invention claimed is:

1. A method for collecting human experience analytics data for visitors browsing a Web site arranged on a web server, said web server comprising a web analytics engine, the method comprising the steps of:
   the web analytics engine registering an action performed by a visitor browsing the Web site;
   categorizing said registered action as a navigation action between web pages of the Web site and/or as an event action, representing an event which took place within a web page of the Web site, using the web analytics engine;
   in the case that the registered action is categorized as an event action, associating the event with a web page of the Web site and recording the action as an event which took place within the associated web page, using the web analytics engine;
   in the case that the registered action is categorized as a navigation action, recording the action as a navigation from a current web page to a subsequent web page, or cancelling recording of the action, based on previously defined criteria, using the web analytics engine;
   thereby obtaining a navigational sequence of web pages as experienced by a visitor, listing zero or more events within each web page in addition to the sequence of web pages; and
   storing the recorded events and navigations in a data storage facility;
   wherein the step of categorizing the registered action is performed server-side in-process of the action on the basis of one or more categorization rules which have previously been programmed into the code of the Web site.

2. The method according to claim 1, further comprising the step of recording the time and/or sequence of events occurring within a web page.

3. The method according to claim 1, wherein a given event is selectively associated with the current web page, a previous web page or a subsequent web page in a navigation sequence performed by the visitor.

4. The method according to claim 1, further comprising the step of updating a profile for the visitor based on the recorded events and navigations, and based on a set of profile keys and values assigned to each event action and navigation action.

5. The method according to claim 4, wherein the step of updating a profile for the visitor is performed in real time.

6. The method according to claim 4, further comprising the steps of
   selecting one or more web page components based on the updated visitor profile, and
   displaying the selected component(s) on a web page being viewed by the visitor.

7. The method according to claim 6, wherein the step of updating a profile for the visitor further comprises updating said profile based on the selected and displayed component(s).

8. The method according to claim 1, further comprising the step of analyzing the stored recorded events and navigations.

9. The method according to claim 8, further comprising the step of providing information regarding analytics data pertaining to each web page of the Web site, based on said analysis.

10. A web analytics data collection engine comprising:

a computer processor coupled to a memory configured to perform the steps of:

registering an action performed by a visitor browsing the Web site;

categorizing said registered action as a navigation action between web pages of the Web site and/or as an event action, representing an event which took place within a web page of the Web site;

in the case that the registered action is categorized as an event action, associating the event with a web page of the Web site and recording the action as an event which took place within the associated web page;

in the case that the registered action is categorized as a navigation action, recording the action as a navigation from a current web page to a subsequent web page, or cancelling recording of the action, based on previously defined criteria;

thereby obtaining a navigational sequence of web pages as experienced by a visitor, listing zero or more events within each web page in addition to the sequence of web pages; and storing registered events and navigations in data storage facilities;

wherein the step of categorizing the registered action is performed server-side in-process of the action on the basis of one or more categorization rules which have previously been programmed into the code of the Web site.

11. The web analytics data collection engine according to claim 10, wherein the web analytics data collection engine forms part of a web content management system.

12. The web analytics data collection engine according to claim 10, wherein the web analytics data collection engine is configured to associate the event with a current web page, a previous web page or a subsequent web page in a navigation sequence performed by a visitor.

* * * * *